(12) United States Patent
Morris

(10) Patent No.: US 8,983,264 B2
(45) Date of Patent: *Mar. 17, 2015

(54) METHODS, SYSTEMS, AND COMPUTER PROGRAM PRODUCTS FOR COORDINATING PLAYING OF MEDIA STREAMS

(71) Applicant: Sitting Man, LLC, Raleigh, NC (US)

(72) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,082

(22) Filed: Mar. 8, 2013

(65) Prior Publication Data

US 2013/0188924 A1    Jul. 25, 2013

Related U.S. Application Data

(63) Continuation of application No. 12/691,042, filed on Jan. 21, 2010, now Pat. No. 8,422,858.

(51) Int. Cl.
*H04N 9/80* (2006.01)
*H04L 29/06* (2006.01)
*H04N 21/436* (2011.01)
*H04N 21/442* (2011.01)

(52) U.S. Cl.
CPC ........ *H04L 65/608* (2013.01); *H04N 21/43615* (2013.01); *H04N 21/44227* (2013.01); *H04N 9/80* (2013.01)
USPC ....................................................... 386/241

(58) Field of Classification Search
None
See application file for complete search history.

(56) References Cited

U.S. PATENT DOCUMENTS

| | | | |
|---|---|---|---|
| 5,311,207 A | 5/1994 | Kusumoto et al. | |
| 7,237,198 B1 | 6/2007 | Chaney | |
| 7,496,277 B2 | 2/2009 | Ackley | |
| 7,512,880 B2 | 3/2009 | Morris | |
| 7,516,188 B2 | 4/2009 | Morris | |
| 7,920,932 B2 | 4/2011 | Igoe | |
| 8,005,236 B2 | 8/2011 | Igoe | |
| 8,146,132 B2 | 3/2012 | Igoe | |
| 8,307,388 B2 | 11/2012 | Igoe et al. | |
| 8,321,038 B2 | 11/2012 | Igoe et al. | |

(Continued)

FOREIGN PATENT DOCUMENTS

EP        1672613        6/2006

OTHER PUBLICATIONS

Extended European Search Report in Application No. 13170578.2, dated Nov. 29, 2013.

(Continued)

*Primary Examiner* — Huy T Nguyen
(74) *Attorney, Agent, or Firm* — Patrick E. Caldwell, Esq.; The Caldwell Firm, LLC

(57) ABSTRACT

Methods and systems are described for coordinating playing of media streams. In one aspect, an access by a media player to a presentation device to play a media stream is detected. Additionally, presentation focus information is accessed for determining whether the media player has presentation focus for playing the media stream. Further, it is determine, based on the presentation focus information, that the media player has presentation focus for playing the media stream. Still further, in response to determining the media player has presentation focus, it is indicated that the media player is allowed to play the media stream via the presentation device.

73 Claims, 10 Drawing Sheets

(56) References Cited

U.S. PATENT DOCUMENTS

| | | |
|---|---|---|
| 8,422,858 B2 | 4/2013 | Morris |
| 2005/0166136 A1 | 7/2005 | Capps |
| 2006/0110136 A1 | 5/2006 | Abecassis |
| 2008/0115073 A1 | 5/2008 | Erickson et al. |
| 2008/0155437 A1 | 6/2008 | Morris |
| 2008/0231546 A1 | 9/2008 | Li |
| 2008/0235588 A1 | 9/2008 | Gonze |
| 2008/0250319 A1 | 10/2008 | Lee |
| 2009/0046545 A1* | 2/2009 | Blinnikka ............. 369/30.06 |
| 2009/0182889 A1 | 7/2009 | Hurst |
| 2009/0219441 A1 | 9/2009 | Kurita |
| 2009/0295905 A1 | 12/2009 | Civanlar et al. |
| 2010/0011285 A1 | 1/2010 | Kawata et al. |
| 2010/0097357 A1 | 4/2010 | Lin |
| 2011/0029915 A1 | 2/2011 | Harris |
| 2012/0032783 A1 | 2/2012 | Ahn et al. |
| 2012/0042275 A1 | 2/2012 | Neerudu et al. |

OTHER PUBLICATIONS

International Search Report and Written Opinion from PCT/US2013/043848, dated Oct. 22, 2013.

Office Action Summary in U.S. Appl. No. 14/089,706 dated Jan. 27, 2014.

"Windows Tips and Tricks," https://www.rescomp.berkeley.edu/resources/software/windowsshortcuts/,~2010, last accessed Nov. 22, 2013.

"Archived—Apple TV: Using AirTunes," http://support.apple.com/kb/HT3291, ~Nov. 19, 2008, last accessed Nov. 22, 2013.

* cited by examiner

METHODS, SYSTEMS, AND COMPUTER PROGRAM PRODUCTS FOR COORDINATING PLAYING OF MEDIA STREAMS

RELATED APPLICATIONS

This is a continuation of U.S. patent application Ser. No. 12/691,042 filed on Jan. 21, 2010.

BACKGROUND

When applications attempt to play more than one media stream on current devices, all the applications are allowed access to the presentation devices of the device, for example a display device and/or an audio device. The media streams are played by corresponding applications without regard for other media streams being played. Watching a video or listening to a song with interference from other audio streams and video streams is a common experience.

When listening to a song and browsing the web, many web sites include audio in their web pages. The web page audio plays despite the fact that a song is already playing. This often leads to an unpleasant listening experience. If a user locates multiple videos and accesses them in multiple browser windows and/or tabs, the videos play as if a user is able to watch all of them at the same time. Videos in windows that are obscured by other windows or that are minimized continue to play as if there was someone watching. Some web pages do wait to detect they have input focus before beginning to play a stream, but these pages play their streams without regard for other media players playing and/or otherwise accessing a display or speakers to play one or more media streams.

Accordingly, there exists a need for methods, systems, and computer program products for coordinating playing of media streams.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for coordinating playing of media streams. In one aspect the method includes detecting a first media player access to a first presentation device to play a first media stream. The method further includes accessing first presentation focus information for determining whether the first media player has first presentation focus for playing the first media stream. The method still further includes determining, based on the first presentation focus information, that the first media player has first presentation focus. The method also includes indicating, in response to determining the first media player has first presentation focus, that the first media player is allowed to play the first media stream via the first presentation device.

Further, a system for coordinating playing of media streams is described. The system includes an execution environment including an instruction processing unit configured to process an instruction included in at least one of a presentation access component, a focus state component, and a focus director component. The system includes the presentation access component configured for detecting a first media player access to a first presentation device to play a first media stream. The system further includes the focus state component configured for accessing first presentation focus information for determining whether the first media player has first presentation focus for playing the first media stream. The system still further includes the focus director component configured for determining, based on the first presentation focus information, that the first media player has first presentation focus. The system also includes the presentation access component configured for indicating, in response to determining the first media player has first presentation focus, that the first media player is allowed to play the first media stream via the first presentation device.

In another aspect, a method for coordinating playing of media streams is described that includes receiving, by a media player, a media stream to play on a presentation device. The method further includes determining, by the media player, that the media player has presentation focus indicating permission to play the media stream via the presentation device. The method still further includes playing the media stream via the presentation device while the media player is determined to have presentation focus.

Still further, a system for coordinating playing of media streams is described. The system includes an execution environment including an instruction processing unit configured to process an instruction included in at least one of a presentation access component and a focus director component. The system includes the presentation access component configured for receiving, by a media player, a media stream to play on a presentation device. The system includes the focus director component configured for determining, by the media player, that the media player has presentation focus indicating permission to play the media stream via the presentation device. The system still further includes the presentation access component configured for playing the media stream via the presentation device while the media player is determined to have presentation focus.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Prior to describing the subject matter in detail, an exemplary device included in an execution environment that may be configured according to the subject matter is described. An execution environment is an arrangement of hardware and, optionally, software that may be further configured to include an arrangement of components for performing a method of the subject matter described herein.

Figure 1:
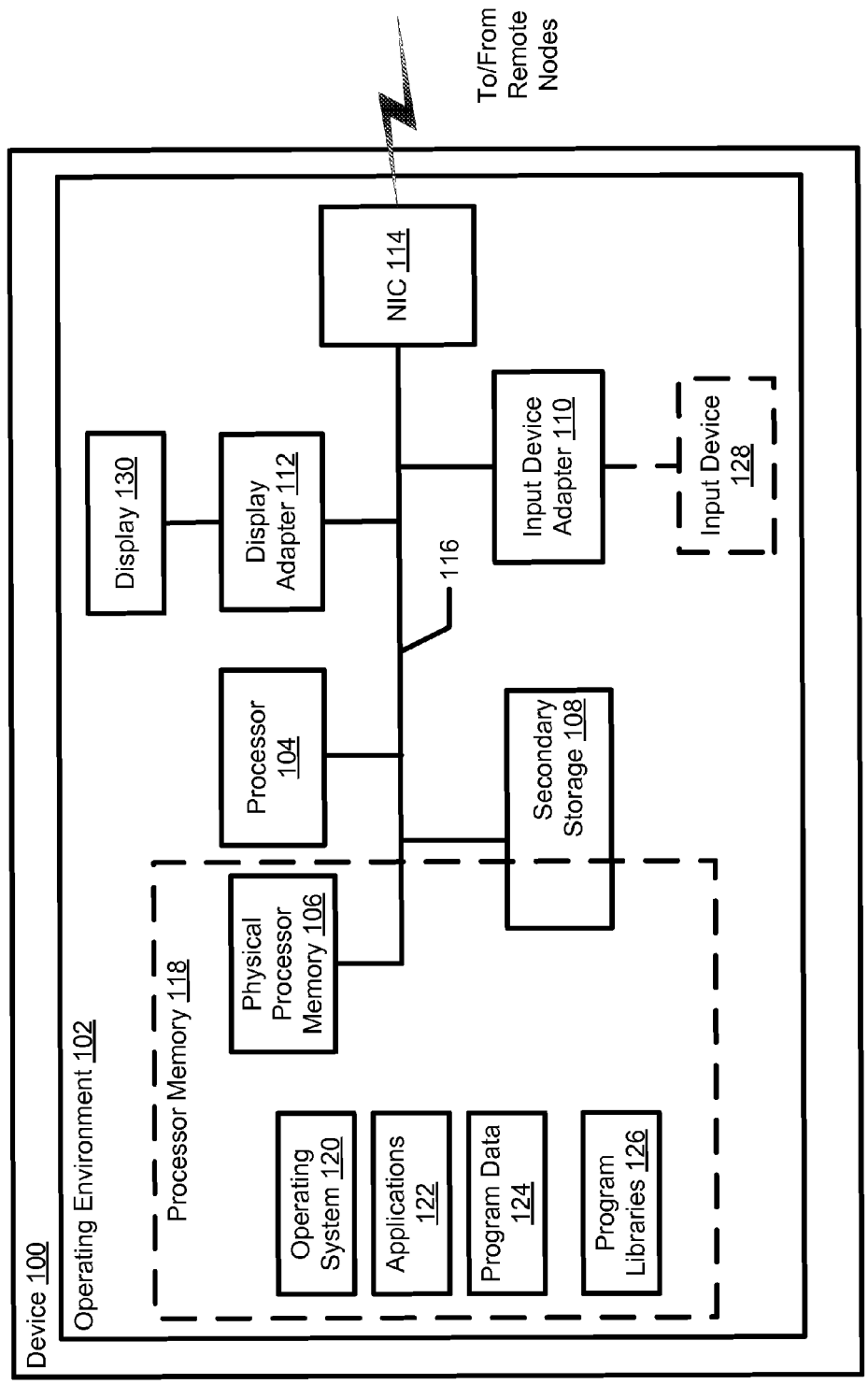
FIG. 1 is a block diagram illustrating an exemplary hardware device included in and/or otherwise providing an execution environment in which the subject matter may be implemented.

Those of ordinary skill in the art will appreciate that the components illustrated in FIG. 1 may vary depending on the execution environment implementation. An execution environment includes or is otherwise provided by a single device or multiple devices, which may be distributed. An execution environment may include a virtual execution environment including software components operating in a host execution environment. Exemplary devices included in or otherwise providing suitable execution environments for configuring according to the subject matter include personal computers, servers, hand-held and other mobile devices, multiprocessor systems, consumer electronic devices, and network-enabled devices such as devices with routing and/or switching capabilities.

With reference to FIG. 1, an exemplary system for configuring according to the subject matter disclosed herein includes hardware device 100 included in execution environment 102. Device 100 includes an instruction processing unit illustrated as processor 104; physical processor memory 106 including memory locations that are identified by addresses in a physical address space of processor 104; secondary storage 108; input device adapter 110; a presentation adapter for presenting information to a user illustrated as display adapter 112; a communication adapter, such as network interface card (NIC) 114, for communicating via a network; and bus 116 that couples elements 104-114.

Bus 116 may comprise any type of bus architecture. Examples include a memory bus, a peripheral bus, a local bus, a switching fabric, etc. Processor 104 is an instruction execution machine, apparatus, or device and may comprise a microprocessor, a digital signal processor, a graphics processing unit, an application-specific integrated circuit (ASIC), a field programmable gate array (FPGA), etc.

Processor 104 may be configured with one or more memory address spaces in addition to the physical memory address space. A memory address space includes addresses that identify corresponding locations in a processor memory. An identified location is accessible to a processor processing an address that is included in the address space. The address is stored in a register of the processor and/or identified in an operand of a machine code instruction executed by the processor.

FIG. 1 illustrates processor memory 118 may have an address space including addresses mapped to physical memory addresses identifying locations in physical processor memory 106. Such an address space is referred to as a virtual memory address space, its addresses are referred to as virtual memory addresses, and its processor memory is known as a virtual processor memory. A virtual processor memory may be larger than a physical processor memory by mapping a portion of the virtual processor memory to a hardware memory component other than a physical processor memory. Processor memory 118 illustrates a virtual processor memory mapped to physical processor memory 106 and to secondary storage 108. Processor 104 may access physical processor memory 106 without mapping a virtual memory address to a physical memory address.

Thus at various times, depending on the address space of an address processed by processor 104, the term processor memory may refer to physical processor memory 106 or a virtual processor memory as FIG. 1 illustrates.

Program instructions and data are stored in physical processor memory 106 during operation of execution environment 102. In various embodiments, physical processor memory 106 includes one or more of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Processor memory may also include nonvolatile memory technologies such as nonvolatile flash RAM (NVRAM), ROM, or disk storage. In some embodiments, it is contemplated that processor memory includes a combination of technologies such as the foregoing, as well as other technologies not specifically mentioned.

In various embodiments, secondary storage 108 includes one or more of a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide volatile and/or nonvolatile storage of computer readable instructions, data structures, program components and other data for the execution environment 102. As described above, when processor memory 118 is a virtual processor memory, at least a portion of secondary storage 108 is addressable via addresses in a virtual address space of the processor 104.

A number of program components may be stored in secondary storage 108 and/or in processor memory 118, including operating system 120, one or more applications programs (applications) 122, program data 124, and other program code and/or data components as illustrated by program libraries 126.

Execution environment 102 may receive user-provided commands and information via input device 128 operatively coupled to a data entry component such as input device adapter 110. An input device adapter may include mechanisms such as an adapter for a keyboard, a touch screen, a pointing device, etc. An input device included in execution environment 102 may be included in device 100 as FIG. 1 illustrates or may be external (not shown) to the device 100. Execution environment 102 may support multiple internal and/or external input devices. External input devices may be connected to device 100 via external data entry interfaces supported by compatible input device adapters. By way of example and not limitation, external input devices may include a microphone, joystick, game pad, satellite dish, scanner, or the like. In some embodiments, external input devices may include video or audio input devices such as a video camera, a still camera, etc. Input device adapter 110 receives input from one or more users of execution environment 102 and delivers such input to processor 104, physical processor memory 106, and/or other components operatively coupled via bus 116.

Output devices included in an execution environment may be included in and/or external to and operatively coupled to a device hosting and/or otherwise included in the execution environment. For example, display 130 is illustrated connected to bus 116 via display adapter 112. Exemplary display devices include liquid crystal displays (LCDs), light emitting diode (LED) displays, and projectors. Display 130 presents output of execution environment 102 to one or more users. In some embodiments, a given device such as a touch screen functions as both an input device and an output device. An output device in execution environment 102 may be included in device 100 as FIG. 1 illustrates or may be external (not shown) to device 100. Execution environment 102 may support multiple internal and/or external output devices. External output devices may be connected to device 100 via external data entry interfaces supported by compatible output device adapters. External output devices may also be connected to bus 116 via internal or external output adapters. Other peripheral output devices, not shown, such as speakers and printers, tactile, and motion producing devices may be connected to device 100. As used herein the term display includes image projection devices.

A device included in or otherwise providing an execution environment may operate in a networked environment using logical connections to one or more devices (not shown) via a communication interface. The terms communication interface and network interface are used interchangeably. Device 100 illustrates network interface card (NIC) 114 as a network interface included in execution environment 102 to operatively couple execution environment 102 to a network. The terms network node and node in this document both refer to a device having a network interface operatively coupled to a network.

A network interface included in a suitable execution environment, such as NIC 114, may be coupled to a wireless network and/or a wired network. Examples of wireless networks include a BLUETOOTH network, a wireless personal area network (WPAN), a wireless 802.11 local area network (LAN), and/or a wireless telephony network (e.g., a cellular, PCS, or GSM network). Examples of wired networks include a LAN, a fiber optic network, a wired personal area network, a telephony network, and/or a wide area network (WAN). Such networking environments are commonplace in intranets, the Internet, offices, enterprise-wide computer networks and the like. In some embodiments, NIC 114 or a functionally analogous component includes logic to support direct memory access (DMA) transfers between processor memory 118 and other components.

In a networked environment, program components depicted relative to execution environment 102, or portions thereof, may be stored in a remote storage device, such as, on a server. It will be appreciated that other hardware and/or software to establish a communications link between the node illustrated by device 100 and other network nodes may be included.

Figure 2:
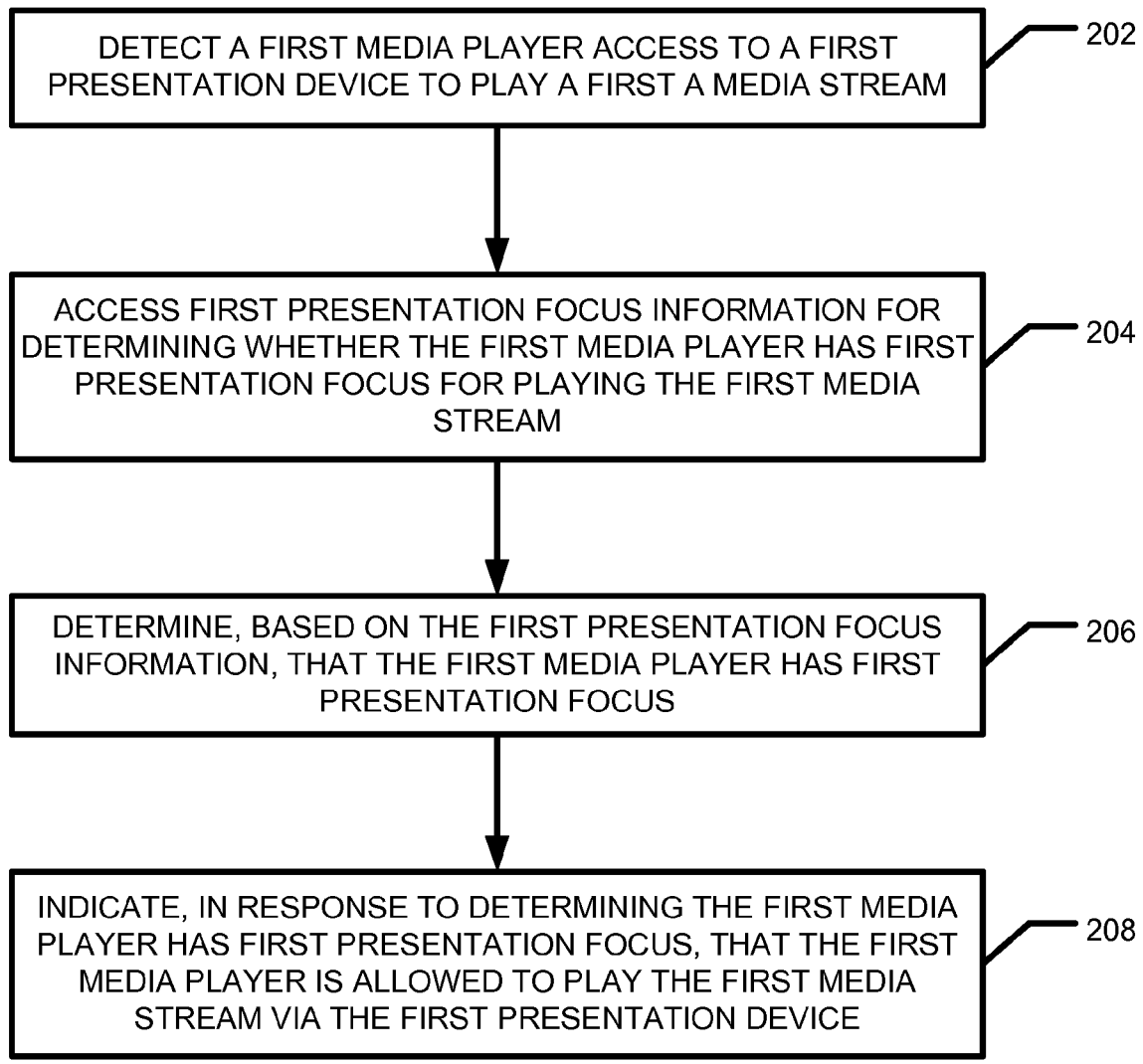
FIG. 2 is a flow diagram illustrating a method for coordinating playing of media streams according to an aspect of the subject matter described herein.
Figure 3:
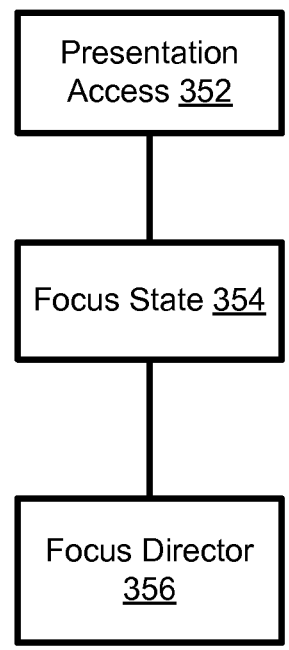
FIG. 3 is block a diagram illustrating an arrangement of components for coordinating playing of media streams according to another aspect of the subject matter described herein.

FIG. 2 is a flow diagram illustrating a method for coordinating playing of media streams according to an exemplary aspect of the subject matter described herein. FIG. 3 is a block diagram illustrating an arrangement of components for coordinating playing of media streams according to another exemplary aspect of the subject matter described herein.

A system for coordinating playing of media streams includes an execution environment, such as execution environment 102, including an instruction processing unit, such as processor 104, configured to process an instruction included in at least one of a presentation access component 352, a focus state component 354, and a focus director component 356. The components illustrated in FIG. 3 may be adapted for performing the method illustrated in FIG. 2 in a number of execution environments. A general description is provided in terms of execution environment 102.

With reference to FIG. 2, block 202 illustrates the method includes detecting a first media player access to a first presentation device to play a first media stream. Accordingly, a system for coordinating playing of media streams includes means for detecting a first media player access to a first presentation device to play a first media stream. For example, as illustrated in FIG. 3, presentation access component 352 is configured for detecting a first media player access to a first presentation device to play a first media stream.

FIG. 3 illustrates presentation access component 352 which enables the arrangement of component in FIG. 3 to detect and/or otherwise have information identifying media streams that may currently be played on a presentation device, such as display 130. In FIG. 3, presentation access component 352 identifies such media streams by detecting, directly and/or indirectly, access to a presentation device, such as display 130 to play a media stream by an application, referred to herein as a media player.

A device and/or node may include other types of presentation devices for playing corresponding types of media streams. Audio devices are commonly included in and/or operatively coupled to many devices and network nodes. Some devices include and/or are operatively coupled to presentation devices that provide tactile output and are configured to play streams of tactile data. A few devices currently exist that are configured to emit odors that users may smell. Odor data can be provided as a stream. Thus in various aspects a presentation device may include a visual, an audio, tactile, and/or odor producing presentation device. Correspondingly, exemplary media streams include a video or image data stream, an audio stream, and a stream of other presentable sensory data.

As used herein, the term media player refers to a component configured to present a media stream on a presentation device. A media player may include software and/or hardware components configured to access one or more types of presentation devices. An audio player, video player, and/or or other media player type may process and play audio data, video data, and/or other media data, respectively, in a compressed and/or uncompressed format. A media player may be a multimedia player configured to play multiple media streams concurrently, typically in a synchronized fashion. A movie player is an example of a multimedia player. Exemplary audio container formats include WAV, AIFF, and XMF. Exemplary container formats for video data include 3GP, ASF, MP4, and OGG. Containers for video formats often are defined to include audio and other types of data streams.

An access to a presentation device by a media player may be detected via an access to any program addressable entity and/or resource included in accessing the presentation device.

An access to a presentation device may be detected by any component included in the operation of accessing the presentation device.

For example, in FIG. 1 an application 122 may receive an indication such as a user input detected by input device 128 to present data on display 130. In receiving the indication, an access to display 130 may be detected. Access to a corresponding presentation device may be detected via an application 122 access of a function, a method, a data element, and/or other program entity included in and/or otherwise processed by a program library 126 and/or operating system 122 to play a media stream. For example, access to a memory location for buffering a media stream may be detected. In certain contexts, such an access is included in accessing display 130 and/or display adapter 112.

Those skilled in the art will see based on the descriptions included in this document that presentation access component 352 may be included in and/or interoperate with any component configured to prepare for and/or access a presentation device, and/or configured to access a resource processed in accessing a presentation device. For example, in various aspects presentation access component 352 and its analogs may be included in a media player application included in applications 122; program libraries 126; operating system 120; a communications component for sending and/or receiving a media stream and/or for sending and/or receiving a resource for accessing a presentation device; an input processing component configured to detect an input for accessing a presentation device; display adapter 112 and/or other presentation adapter(s); a presentation device driver; the presentation device accessed; an internet browser; a client of a network application operating in and/or or otherwise processed by the internet browser; the network application; and a proxy mediating communication between the network application and the browser.

In another aspect, presentation access component 352 and/or an analog may be a component that is informed of an access and/or access attempt rather than or in addition to being a component included in accessing a presentation device. For example, presentation access component 352 or an analog may be informed of an access to a presentation device by a component providing a resource and/or service for accessing the presentation device and/or a component configured to access the presentation device directly. Presentation access component 352 or an analog may be a routine that is called prior to and/or during an access of a presentation device.

Exemplary resources in various aspects that may be included in a media player access to a presentation device include one or more of a semaphore; a lock; a presentation space such as display and/or audio buffer; a component of a user interface subsystem and/or library; a component of a user interface element; a component of an audio subsystem and/or library; a display adapter and/or resource of a display adapter; a display device and/or resource of a display device; an audio adapter and/or resource of an audio adapter, an audio presentation device and/or resource of an audio presentation device; a tactile output subsystem and/or resource of a tactile output subsystem; a tactile output device and/or resource of a tactile output device; an access control component and/or resource of an access control component; a serialization component and/or a resource of a serialization component; and/or a synchronization component and/or resource of a synchronization component.

As used in this document the term presentation space refers to a storage region allocated and/or otherwise provided for storing an audio, visual, tactile, and/or other sensory data component for presentation on a presentation device. For example a buffer for storing a video frame is a presentation space. A presentation space may be contiguous or non-contiguous. A presentation space may have a virtual as well as a physical representation. A presentation space may include a storage location in processor memory, secondary storage, a memory of a presentation adapter device, and storage medium of the first presentation device. A screen of a display is another example of a presentation space.

A user interface element is an element or visual component of a graphical user interface (GUI). Exemplary user interface elements include windows, dialog boxes, textboxes, various types of button controls including check boxes and radio buttons, sliders, list boxes, drop-down lists, spinners, various types of menus, toolbars, ribbons, combo boxes, tree views, grid views, navigation tabs, scrollbars, labels, tooltips, text in various fonts, balloons, and dialog boxes. Those skilled in the art will know that this list is not exhaustive. The terms visual representation, visual component, and user interface element are used interchangeably in this document.

A user interface (UI) element handler (UIEH) component is a component configured to send information representing a program entity for presenting a visual representation of the program entity by a display. The visual representation is presented based on the sent information. The sent information is referred to herein as representation information. Representation information includes data in one or more formats including image formats such as JPEG, video formats such as MP4, markup language data such as HTML and other XML-based markup, and/or instructions such as those defined by various script languages, byte code, and/or machine code. For example, a web page received by a browser from a remote application provider may include HTML, ECMAScript, and/or byte code for presenting one or more user interface elements included in a user interface of the remote application.

A program entity is an object included in and/or otherwise processed by an application or other program component. A representation of a program entity may be represented and/or otherwise maintained in a presentation space.

A presentation device may be included in an execution environment hosting an adaptation of the arrangement of components in FIG. 3 or an analog of the arrangement. Alternatively or additionally, a presentation device may be accessed via a network and may be included in and/or otherwise operatively coupled to a node included in and/or otherwise providing another execution environment.

An access may be detected by presentation access component 352 and/or its analogs based on one or more interprocess communication mechanisms such as a hardware interrupt, a software interrupt, a pipe, and/or a message queue. An access may be detected base on a message received via a network such as request from a browser and/or a response from a server hosted application. An access may be detected based on a function and/or method call to presentation access component 352 and/or other process including execution of a machine code branch instruction.

Returning to FIG. 2, block 204 illustrates the method further includes accessing first presentation focus information for determining whether the first media player has first presentation focus for playing the first media stream. Accordingly, a system for coordinating playing of media streams includes means for accessing first presentation focus information for determining whether the first media player has first presentation focus for playing the first media stream. For example, as illustrated in FIG. 3, focus state component 354 is configured for accessing first presentation focus information for determining whether the first media player has first presentation focus for playing the first media stream.

Focus state component 354 may maintain and/or otherwise access information, referred to as presentation focus information. Presentation focus information identifies and/or otherwise enables the identification of one or more media players and whether the media players have presentation focus.

Presentation focus information may be maintained by and/or for one or more media players, media streams, and/or presentation devices. In an aspect, presentation focus information may identify a single media stream for playing on a presentation device. In another aspect, presentation focus information may identify more than one media stream of one or more media players for playing on one or more presentation devices. That is, multiple presentation devices may play media streams at the same time and/or multiple media players may play corresponding media streams on a shared presentation device.

Presentation focus for a media player is determined based on presentation focus information accessed by focus state component 354. Focus state component 354 may access presentation focus information via any of the means described above with respect to presentation access component 352. Focus state component 354 may be included in and/or otherwise interoperate with one or more presentation devices, and/or one or more media players.

As used herein, the term presentation focus refers to an attribute associated with a media player, directly and/or indirectly, indicating whether the media player is allowed to access one or more presentation devices for playing one or more corresponding media streams on the presentation devices. A media player may play a media stream on a device while the media player has presentation focus. Focus state component 354 is configured to access presentation focus information to determine whether a particular media player has presentation focus for a media stream for playing on a presentation device.

Presentation focus differs from input focus. A user interface element with input focus is an element to which input from one or more particular input devices is directed. For example, when a dialog box has input focus with respect to a keyboard, keyboard input is directed to an application handling the dialog box. Presentation focus relates to output. Presentation focus is an attribute for restricting and coordinating access to an output device by one or more applications.

FIG. 3 illustrates focus state component 354 operatively coupled to presentation access component 352. In an aspect, when presentation access component 352 detects a media player access to a presentation device to play a media stream, presentation access component 352 may interoperate with focus state component 354 to access corresponding presentation focus information.

Alternatively or additionally, focus state component 354 may access presentation focus information and detect a change in presentation focus. In response to detecting the change, focus state component 354 may interoperate with presentation access component 352 to detect an access which may have occurred prior to the change and/or subsequent to the change.

In various aspects, presentation focus information may include and/or otherwise be based on input focus information, a position corresponding to a pointing device such as mouse and/or touch screen, a detected user input, a z-order of a user interface element including a presentation space for presenting a media stream, a measure of user visibility of a presentation space for presenting a media stream, an order of detected access, and/or a priority associated with a media stream and/or media player. Priority may be based on a content type of a media stream; a source of the stream, and/or a time a media stream and/or media player has been waiting for presentation focus. The list provided is exemplary and not exhaustive.

Returning to FIG. 2, block 206 illustrates the method yet further includes determining, based on the first presentation focus information, that the first media player has first presentation focus. Accordingly, a system for coordinating playing of media streams includes means for determining, based on the first presentation focus information, that the first media player has first presentation focus. For example, as illustrated in FIG. 3, focus director component 354 is configured for determining, based on the first presentation focus information, that the first media player has first presentation focus.

Focus director component 356 is configured to determine and/or otherwise detect whether a media player has presentation focus for playing a media stream on a presentation device. The determination is based on presentation focus information which may include information for one or more media players, one or more corresponding media streams, and/or one or more presentation devices, as well as other information. The determining may include matching and/or otherwise processing the value of a focus state data variable, evaluating a policy based on identified attribute information, evaluating a matching expression, and/or checking a threshold. The determining may include interoperation with one or more media players and/or another component included in and/or configured to interoperate with focus director component 356 such as a graphics subsystem, display adapter 112, and/or display device 130.

The determining, in various aspects, may be performed by focus director component 356 and/or its analogs based on one or more interprocess communication mechanisms such as a hardware interrupt, a software interrupt, a pipe, and/or a message queue. Determining presentation focus may be based a message received via a network such as request from browser and/or a response from a server hosted application. Determining presentation focus may be based on a function and/or method call to and/or by focus director component 356 and/or other process including execution of a machine code branch instruction.

Focus director component 356 may be included in and/or otherwise interoperate with one or more presentation devices and/or one or more media players. In an aspect, presentation focus may be associated with a single media stream for playing on a presentation device. In another aspect, presentation focus may be associated with more than one media stream of one or more media players to access one or more media presentation devices.

FIG. 3 illustrates focus director component 356 operatively coupled to focus state component 354. In an aspect, when focus state component 354 accesses presentation focus information, focus state component 354 may interoperate with focus director component 356 to correspondingly determine whether a media player has presentation focus. Alternatively or additionally, focus director component 356 may interoperate with focus state component 354 in response to presentation access component 352 detecting a media player access to a presentation device to play a media stream.

In another aspect, determining whether the first media player has presentation focus may include determining that the first media player does not have presentation focus. In response to determining that the first media player does not have presentation focus, focus director component 356 may interoperate with presentation access component 352 to provide a no-play indication indicating that the first media player is not allowed to play the first media stream on the first presentation device. Focus director component 356 may determine that the first media player does not have presentation focus based on the accessed presentation focus information.

Subsequently, focus state component 354 may access presentation focus information based on a detected change in the information and/or an indication of a change in the information. Based on the detected change, focus state component 354 may provide updated presentation focus information to focus director component 356. Focus director component 356 determines whether the first media player has presentation focus based on the updated presentation focus information and determines that the first media player has presentation focus.

A change in presentation focus information and a corresponding change in presentation focus for a media player playing a media stream on a presentation device may be based on any number of changes detected within an execution environment hosting an adaptation of the arrangement of components in FIG. 3 and/or an analog of the arrangement.

For example, a second media player may release presentation focus by and/or otherwise in response to changing its mode of operation from play mode to stop, pause, rewind, and/or fast forward mode. A second media stream on the first media device and/or a second media device may be halted or played by a component other than the second stream's media player affecting presentation focus information and thus presentation focus for a first media player.

A user input for identifying a particular media stream and/or player to play may be detected resulting in a change to presentation focus information. Alternatively or additionally, a change in an attribute of a user interface may be detected. For example, a z-order of a user interface element for presenting the first media stream by the first media play may change corresponding to a change in the user interface element being an element hidden from a user to a visible element. A z-order change may be absolute depending on a particular z-order value and/or may be relative depending on a relationship between the z-orders of two or more UI elements.

Alternatively or additionally, a relationship between input focus and presentation focus may be configured. Focus director component 356 may determine that the first media player has presentation focus when it also has input focus. For example, execution environment 102 may include a remote control device including controls for controlling a media player. When a media player component has input focus corresponding to the remote control device, it may be configured to have presentation focus for a presentation device corresponding to the remote control device.

A change in an attribute of a presentation device may result in a change in presentation focus information and presentation focus for a media player. For example, resolution of a screen of display 130 may change allowing more UI elements to be visible at a given time. The opposite may occur as well restricting the number of UI elements that may be visible. A position of a UI element may change a size of a visible area of a presentation space for the first media stream. For example, focus director component 356 may access a policy specifying a proportion and/or an absolute size of the presentation space that must be visible to a user before the first media player may have presentation focus.

In an aspect, the media player may receive and/or otherwise access a multi-media container such as an MPEG-4 file or message stream received and/or to be sent via a network for presentation on more than one presentation device. The MPEG-4 container may include a video stream and an audio stream to be played in a synchronized manner. The MPEG-4 container may include other streams as well.

In addition to accessing the first media player, for example display 130, presentation access component 352 may detect first media player accessing an audio device (not shown) to play the audio stream along with the video stream. Focus state component 354 may access second presentation focus information which may be stored with, included in, and/or along with the first presentation focus information. The second presentation focus information may be defined for determining whether the first media player has access to the second presentation device. Focus director component 356 may then determine whether first media player has second presentation focus to play the second media stream on the second presentation device.

Focus director component 356 may determine that first media player does not have second presentation focus based on the second presentation focus information. In response, focus director component 356 may determine, that first media player does not have first presentation focus to the first presentation device. With respect to the multiple media streams in the media container, first media player does not have presentation focus for accessing the needed presentation devices. Presentation access component 352 may provide a no-play indication indicating that first media player is not allowed to play the first media stream on display 130.

Subsequently, focus state component 354 may access second presentation focus information based on a detected change in the second presentation focus information. Based on the detected change, focus state component 354 may provide updated second presentation focus information to focus director component 356. Focus director component 356 determines whether the first media player has second presentation focus based on the updated second presentation focus information. In response to determining that the first media player has both first presentation focus and second presentation focus, focus director component 356 may determine that the first media player has presentation focus for presenting both media streams included in the media container on both the first and second presentation devices.

In an aspect, focus director component 356 may determine that the first media player has presentation focus for the first presentation device and presentation access component 352 may provide an indication that the first media player may play the video stream on display 130 indicating that the first media player is allowed to play the first media stream. Whether all presentation devices requested are required for focus director component 356 to determine that a media player has presentation focus may be based on a configuration of machine code in the components and/or may be based on stored configuration data provided by, for example, a user of the media player or a system administrator. Alternatively or additionally, the determination may be based on information received from a user prior to and/or during the determining. Focus director component 356 may present and/or provide for presenting a user interface prompting the user for needed information.

In yet another aspect, while the first media player has presentation focus for playing the first stream on the first presentation device, presentation access component 352 may detect a second media player access to the first presentation device to play a second media stream. In the aspect, the arrangement of components in FIG. 3 and/or an analog may prevent the second media player from accessing the first presentation device while the first media player has first presentation focus. Presentation access component 352 may, thus, indicate the second media player is not allowed to play the second media stream on the first presentation device while the first media player has presentation focus for playing the first media stream. First media player may be granted exclusive presentation focus for the first presentation device based on a policy specifying serialized access to the presentation device.

Alternatively, the arrangement of components in FIG. 3 and/or an analog may allow a second media player access to the first presentation device while the first media player has presentation focus. That is, focus director component 356 may determine, based on accessed second presentation information, that second media player has presentation focus for playing the second media stream on the second presentation device. In response to determining that the second media player has second presentation focus, focus director component 356 may indicate that the second media player is allowed to play the second media stream via the first presentation device Determining that second media player has second presentation focus may be based on a condition such as a configured maximum number of media players allowed to concurrently access the first media presentation device.

Such a condition may be based on any number of factors including a count of media streams being played, a ranking of media streams being played, a size of the presentation space viewable by a user, a transparency level of a UI element, and/or an attribute of another UI element sharing a region of a display of a UI element including a presentation space for presenting at least some of the first media stream and/or the second media stream.

Returning to FIG. 2, block 208 illustrates the method additionally includes indicating, in response to determining the first media player has first presentation focus, that the first media player is allowed to play the first media stream via the first presentation device. Accordingly, a system for coordinating playing of media streams includes means for indicating, in response to determining the first media player has first presentation focus, that the first media player is allowed to play the first media stream via the first presentation device. For example, as illustrated in FIG. 3, presentation access component 352 is configured for indicating, in response to determining the first media player has first presentation focus, that the first media player is allowed to play the first media stream via the first presentation device.

In addition to detecting an access by a media player to play a media stream on a presentation device, presentation access component 352 as illustrated in FIG. 3 is also configured to indicate whether the media player is allowed to play the media stream on the presentation device. That is, it monitors and provides access information. In other arrangements, these two capabilities may be provided by separate components.

In various aspects, a play and/or a no-play indication may be provided in different ways. In one aspect, presentation access component 352 may call and/or otherwise instruct the first media player to change its mode of operation to play mode to provide a play indication. Similarly, presentation access component 352 may instruct the first media player to enter a mode other than play mode in providing a no-play indication.

In another aspect, presentation access component 352 may detect access by a first media player to the first presentation device by being included in and/or otherwise intercepting stream data sent from the first media player to the first presentation device. Presentation access component 352 may process the data for presentation as configured, and/or pass it along unprocessed for processing by the first presentation device and/or another component included in the process of presenting the media stream, thus indicating the first media player is allowed to play the first media stream.

In yet another aspect, presentation access component 352 may include and/or otherwise make use of a serialization mechanism such as a semaphore or lock. Presentation access component 352 may provide a play indication by not blocking and/or by unblocking a thread of execution for presenting the first media stream on the first presentation device by the first media player. Alternatively or additionally, presentation access component 352 may provide a play indication by being included in and/or otherwise interoperating with a thread/process scheduler to put one or more threads for playing the first media stream in a run state. Sending a no-play indicator may analogously be performed and/or otherwise provided for by presentation access component 352 by causing one or more threads for playing the first media stream to be blocked from execution by processor 104.

Providing a play indication may further include sending and/or receiving a message via a network to and/or from, respectively, a remote node where either the node hosting presentation access component 352 or the remote node is operatively coupled to a presentation device for presenting a media stream. Presentation access component 352 may be adapted to operate in a client node, a server node, and/or an intermediary node such as a proxy server. A no-play indicator may be provided similarly.

Coordination and control of media streams as described herein may prevent incomprehensible and sometimes unpleasant user experiences resulting from media streams playing simultaneously in an uncoordinated manner. Further, coordination and control of play of multiple media streams according to the subject matter described herein may save resources. For example, battery life may be extended in battery powered devices and less energy may be used in devices connected to an electricity grid.

The components illustrated in FIG. 3 may be adapted for performing the method illustrated in FIG. 2 in a number of execution environments. Adaptations of the components illustrated in FIG. 3 for performing the method illustrated in FIG. 2 are described operating in exemplary execution environment 402 illustrated in various aspects as execution environment 402a in FIG. 4a, execution environment 402b in FIG. 4b, and execution environment 402c in FIG. 4c. A further adaptation of the components illustrated in FIG. 3 for performing the method illustrated in FIG. 2 is described operating in exemplary execution environment 502 illustrated in FIG. 5.

FIG. 1 illustrates key components of an exemplary device that may at least partially provide and/or otherwise be included in an exemplary execution environment, such as those illustrated in FIG. 4a, FIG. 4b, FIG. 4c, and FIG. 5. The components illustrated in FIG. 3, FIG. 4a, FIG. 4b, FIG. 4c, and FIG. 5 may be included in or otherwise combined with the components of FIG. 1 to create a variety of arrangements of components according to the subject matter described herein FIG. 6 illustrates a user node 602 as an exemplary device included in and/or otherwise adapted for providing any of execution environments 402 illustrated in FIG. 4a, FIG. 4b, and FIG. 4c each illustrating a different adaptation of the arrangement of components in FIG. 3. As illustrated in FIG. 6, user node 602 is operatively coupled to network 604 via a network interface, such as NIC 114. Alternatively or additionally, an adaptation of execution environment 402 includes and/or is otherwise provided by a device that is not operatively coupled to a network.

Figure 4A:
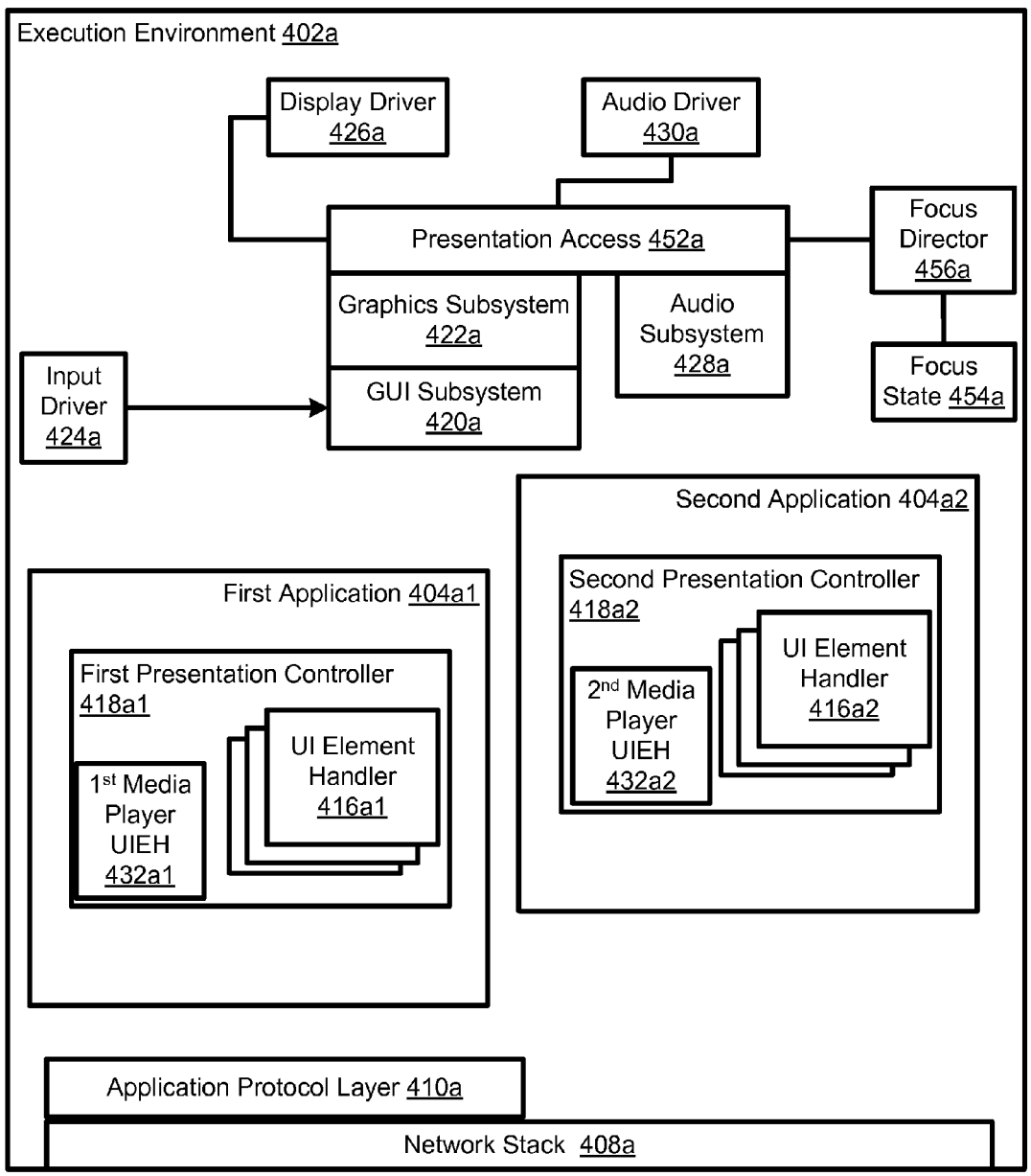
FIG. 4a is a block a diagram illustrating an arrangement of components for coordinating playing of media streams according to another aspect of the subject matter described herein.

FIG. 4a illustrates an adaptation of the arrangement of components in FIG. 3 configured to interoperate with various presentation components provided by execution environment 402a. The arrangement is illustrated operating external to media player applications illustrated as first application 404a1 and second application 404a2.

Figure 4B:
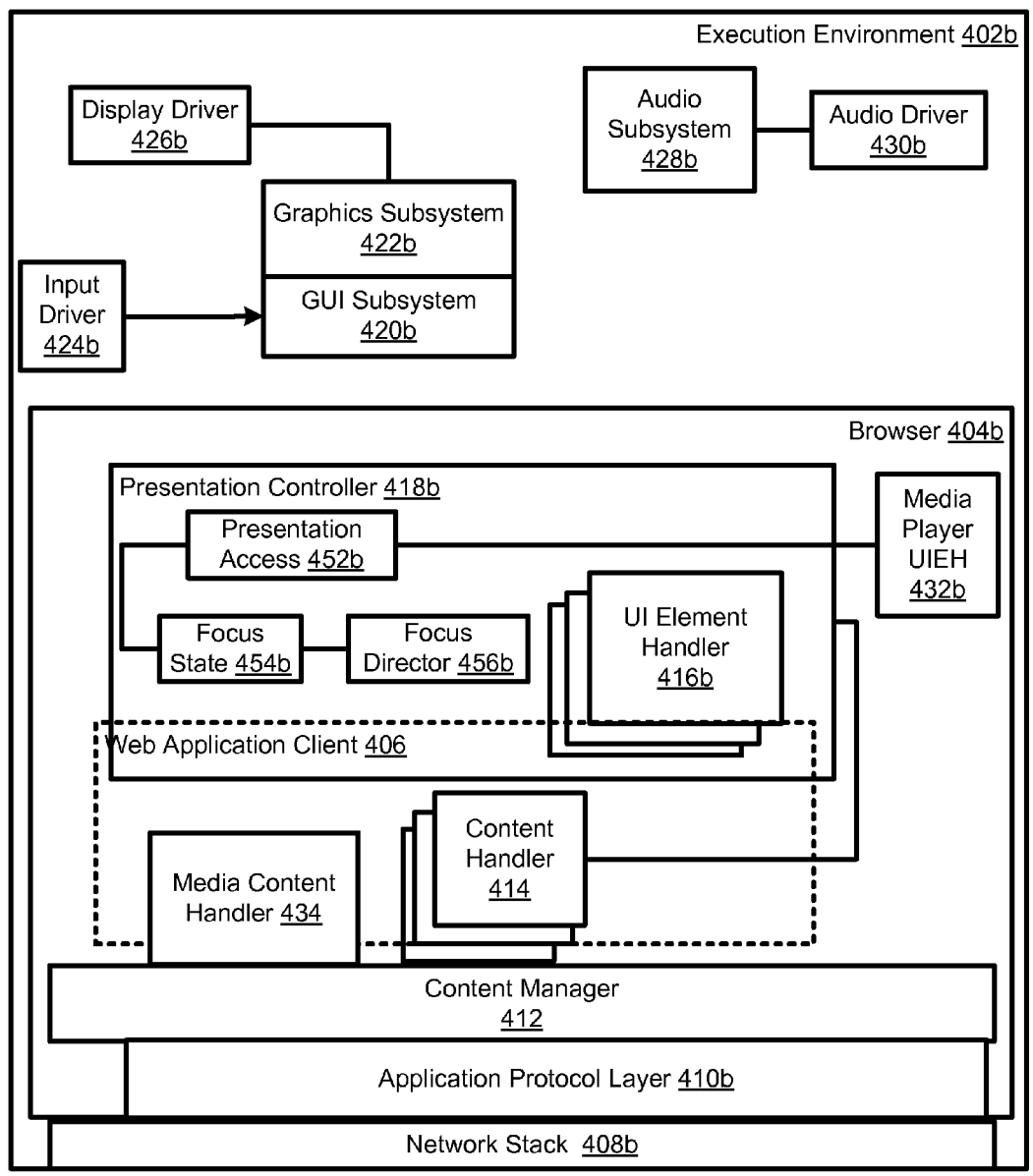
FIG. 4b is a block a diagram illustrating an arrangement of components for coordinating playing of media streams according to another aspect of the subject matter described herein.

FIG. 4b illustrates an adaptation of the arrangement of components in FIG. 3 operating as browser components or components of a browser extension such as a plug-in. Application 404b is illustrated as a browser operating in execution environment 402b providing at least part of an execution environment for web application client 406 received from a remote application provider. FIG. 4b also illustrates an adaptation or analog of the components in FIG. 3 operating at least partially external to one or more web applications serviced by the arrangement and browser 404b.

Figure 4C:
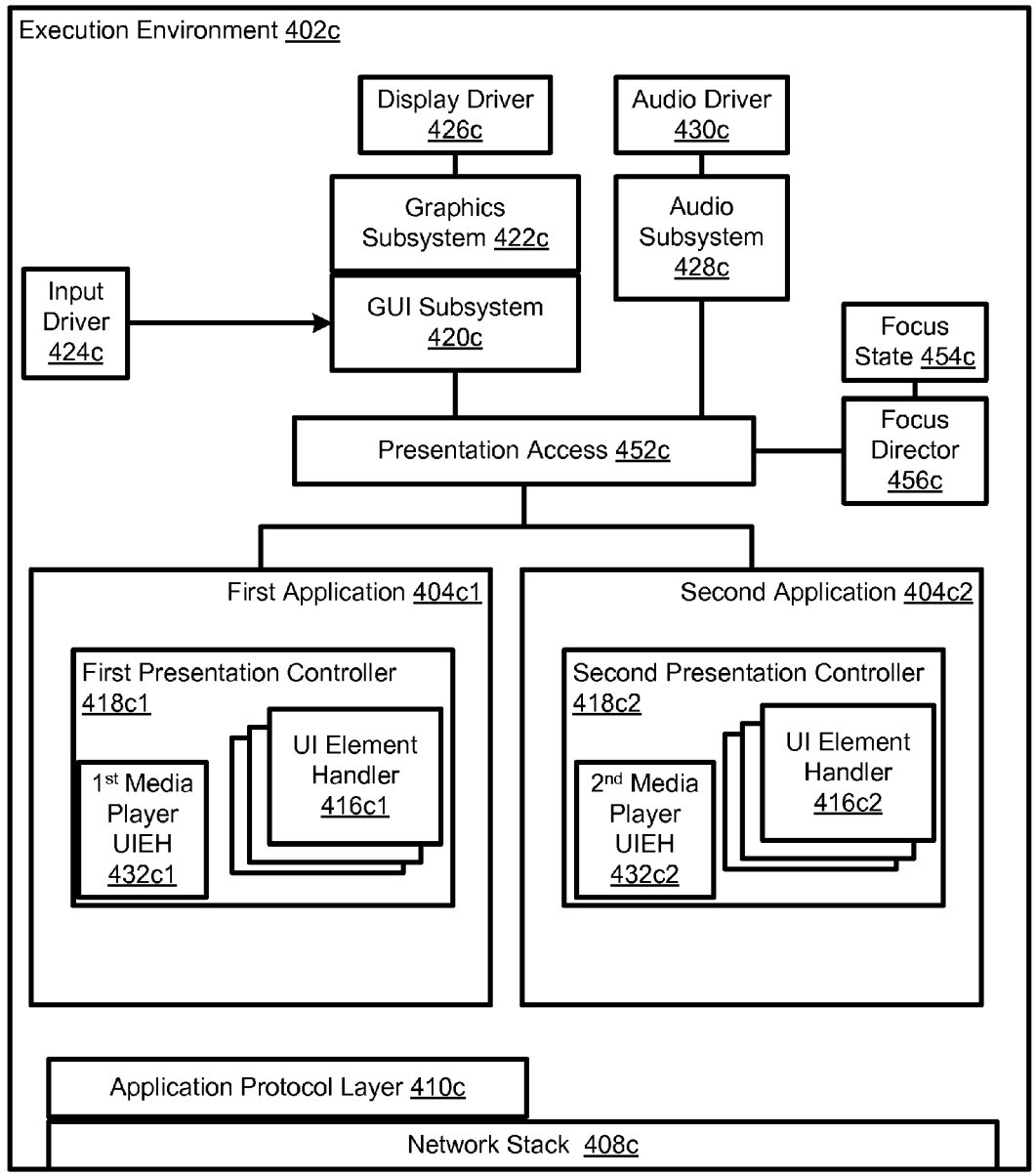
FIG. 4c is a block a diagram illustrating an arrangement of components for coordinating playing of media streams according to another aspect of the subject matter described herein.

FIG. 4c illustrates an arrangement of components in FIG. 3 adapted to operate as an interceptor of communications between media player applications illustrated as first application 404c1 and second application 404c2, and various presentation components provided by execution environment 402c.

Components identifiers including letters in their identifiers in the figures are referred to collectively using the respective identifiers without the postfix including the letters and are, in some cases referred to generically across the figures in the same manner when the including description may apply to all adaptations of components identified in this way. Interpretation of the identifiers will be clear in the context of the including descriptive text in this document.

Figure 5:
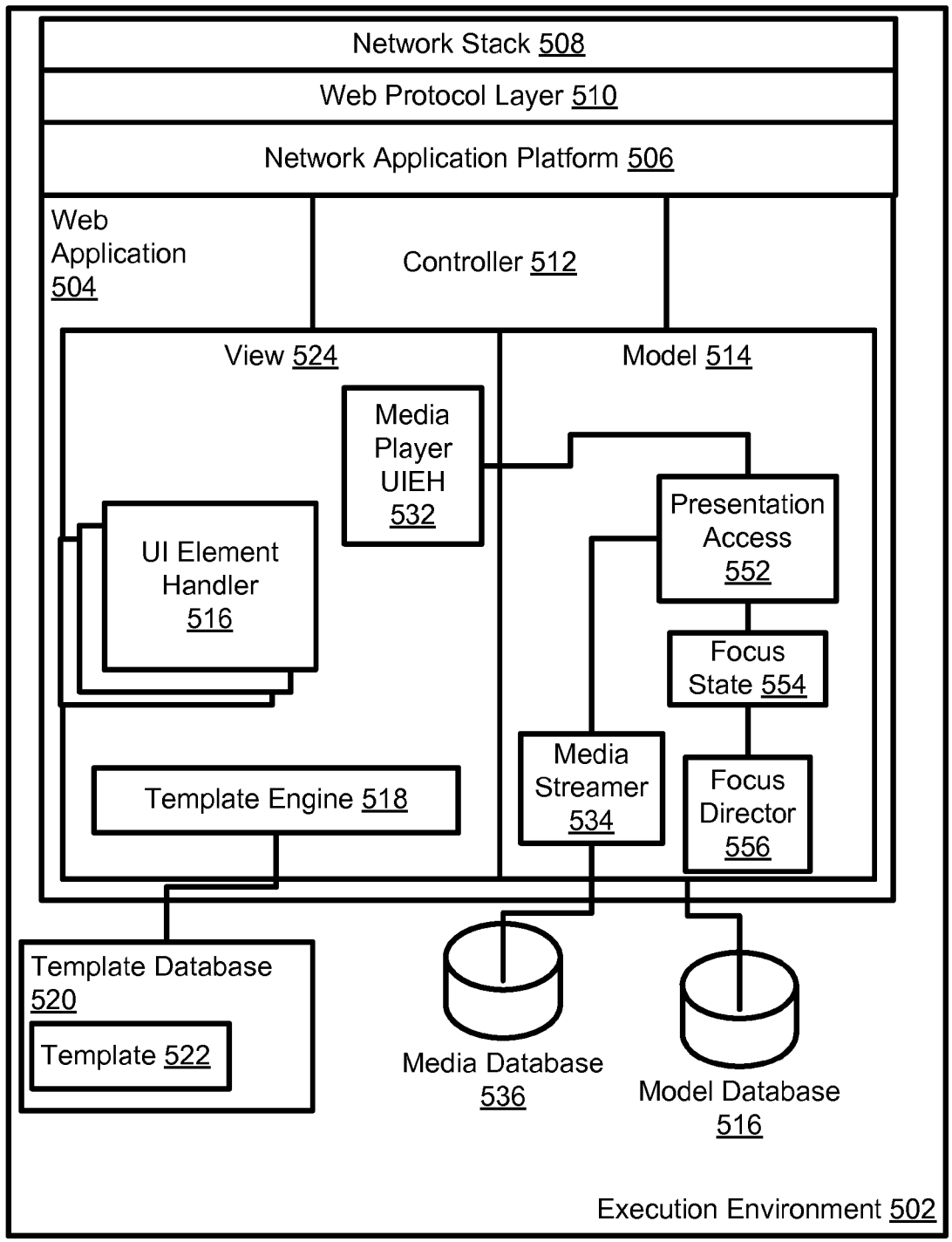
FIG. 5 is a block a diagram illustrating an arrangement of components for coordinating playing of media streams according to another aspect of the subject matter described herein.
Figure 6:
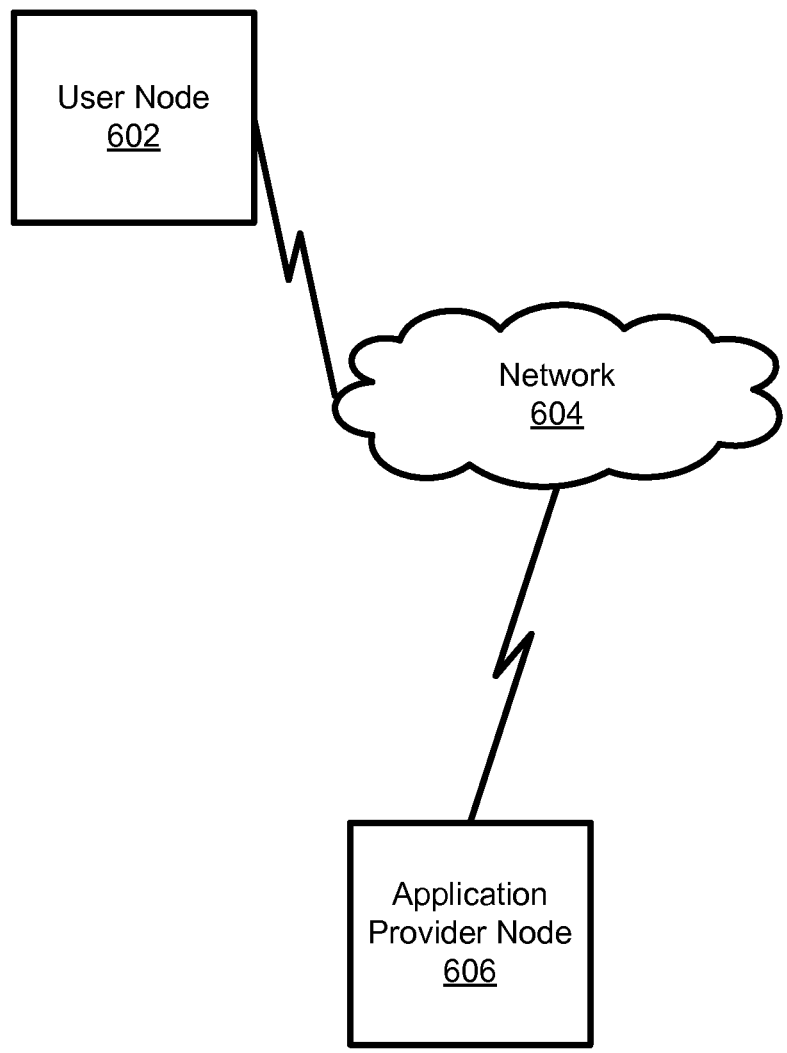
FIG. 6 is a network diagram illustrating an exemplary system for coordinating playing of media streams according to an aspect of the subject matter described herein.

FIG. 5 illustrates a remote application provider as web application provider 504 hosting yet another adaptation or analog of the arrangement of components in FIG. 3. Network application platform 506 may include a web server and/or a network application framework known to those skilled in the art.

Execution environment 402 as illustrated in FIG. 4a, FIG. 4b, and in FIG. 4c may include and/or otherwise be provided by a device such as user node 602 illustrated in FIG. 6. User node 602 may communicate with one or more application providers, such as network application platform 506 operating in execution environment 502. Execution environment 502 may include and/or otherwise be provided by application provider node 606 in FIG. 6. User node 602 and application provider node 606 may each include a network interface operatively coupling each respective node to network 604.

FIG. 4a, FIG. 4b, and FIG. 4c illustrate network stacks 408 configured for sending and receiving messages over network 604, such as the Internet, via the network interface of user node 602. FIG. 5 illustrates network stack 508 serving an analogous role in application provider node 606. Network stacks 408 and network stack 508 may support the same protocol suite, such as TCP/IP, or may communicate via a network gateway or other protocol translation device and/or service. Application 404b in FIG. 4b and network application platform 506 as illustrated in FIG. 5 may interoperate via their respective network stacks; network stack 408b and network stack 508.

FIG. 4a, FIG. 4b, and FIG. 4c illustrate applications 404, and FIG. 5 illustrates web application 504, respectively, which may be configured to communicate via one or more application layer protocols. FIG. 4a, FIG. 4b, and FIG. 4c illustrate application protocol layers 410 exemplifying one or more application layer protocols. Exemplary application protocol layers include a hypertext transfer protocol (HTTP) layer and instant messaging and presence protocol, XMPP-IM layer. FIG. 5 illustrates a compatible application protocol layer as web protocol layer 510. Matching protocols enabling user node 602 to communicate with application provider node 606 via network 604 in FIG. 6 are not required if communication is via a protocol translator.

In FIG. 4b, application 404b may receive web application client 406 in one more messages sent from web application 504 via network application platform 506 and/or sent from web application 504 via network application platform 506 via the network stacks, network interfaces, and optionally via an application protocol layer in each respective execution environment. In FIG. 4b, application 404b includes content manager 412. Content manager 412 may interoperate with one or more of the application layer components 410b and/or network stack 408b to receive the message or messages including some or all of web application client 406.

Web application client 406 may include a web page for presenting a user interface for web application 504. The web page may include and/or reference data represented in one or more formats including hypertext markup language (HTML) and/or markup language, ECMAScript or other scripting language, byte code, image data, audio data, and/or machine code.

The data received by content manager 412 may be received in response to a request sent in a message to web application 504 and/or may be received asynchronously in a message with no corresponding request.

In an example, in response to a request received from browser 404b, controller 512, in FIG. 5, may invoke model subsystem 514 to perform request specific processing. Model subsystem 514 may include any number of request processors for dynamically generating data and/or retrieving data from model database 516 based on the request. Controller 512 may further invoke template engine 518 to identify one or more templates and/or static data elements for generating a user interface for representing a response to the received request. FIG. 5 illustrates template database 520 including an exemplary template 522. FIG. 5 illustrates template engine 518 as a component of view subsystem 524 configured for returning responses to processed requests in a presentation format suitable for a client, such as browser 404b. View subsystem 524 may provide the presentation data to controller 512 to send to application 404b in response to the request received from application 404b. Web application client 406 may be sent to application 404b via network application platform 506 interoperating with network stack 508 and/or application layer 510.

While the example describes sending web application client 406 in response to a request, web application 504 additionally or alternatively may send some or all of web application client 406 to browser 404b via one or more asynchronous messages. An asynchronous message may be sent in response to a change detected by web application 506. A publish-subscribe protocol such as the presence protocol specified by XMPP-IM is an exemplary protocol for sending messages asynchronously in response to a detected change.

The one or more messages including information representing web application client 406 may be received by content manager 412 via one or more of the application protocol layers 410b and/or network stack 408b as described above. FIG. 4b illustrates browser 404b includes one or more content handler components 414 to process received data according to its data type, typically identified by a MIME-type identifier. Exemplary content handler components 414 include a text/html content handler for processing HTML documents; an application/xmpp-xml content handler for processing XMPP streams including presence tuples, instant messages, and publish-subscribe data as defined by various XMPP specifications; one or more video content handler components processing video streams of various types; and still image data content handler components for processing various images types. Content handler components 414 process received data and provide a representation of the processed data to one or more user interface element handlers 416*b*.

User interface element handlers 416 are illustrated in presentation controller 418 in FIG. 4*a*, FIG. 4*b*, and FIG. 4*c*. A presentation controller 418 may manage the visual components of its including application as well as receive and route detected user and other inputs to components and extensions of its including application. A user interface element handler 416*b* in various aspects may be adapted to operate at least partially in a content handler 414 such as the text/html content handler and/or a script content handler. Additionally or alternatively a user interface element handler 416 may operate in an extension of its including application, such as a plug-in providing a virtual machine for script and/or byte code.

Figure 7:
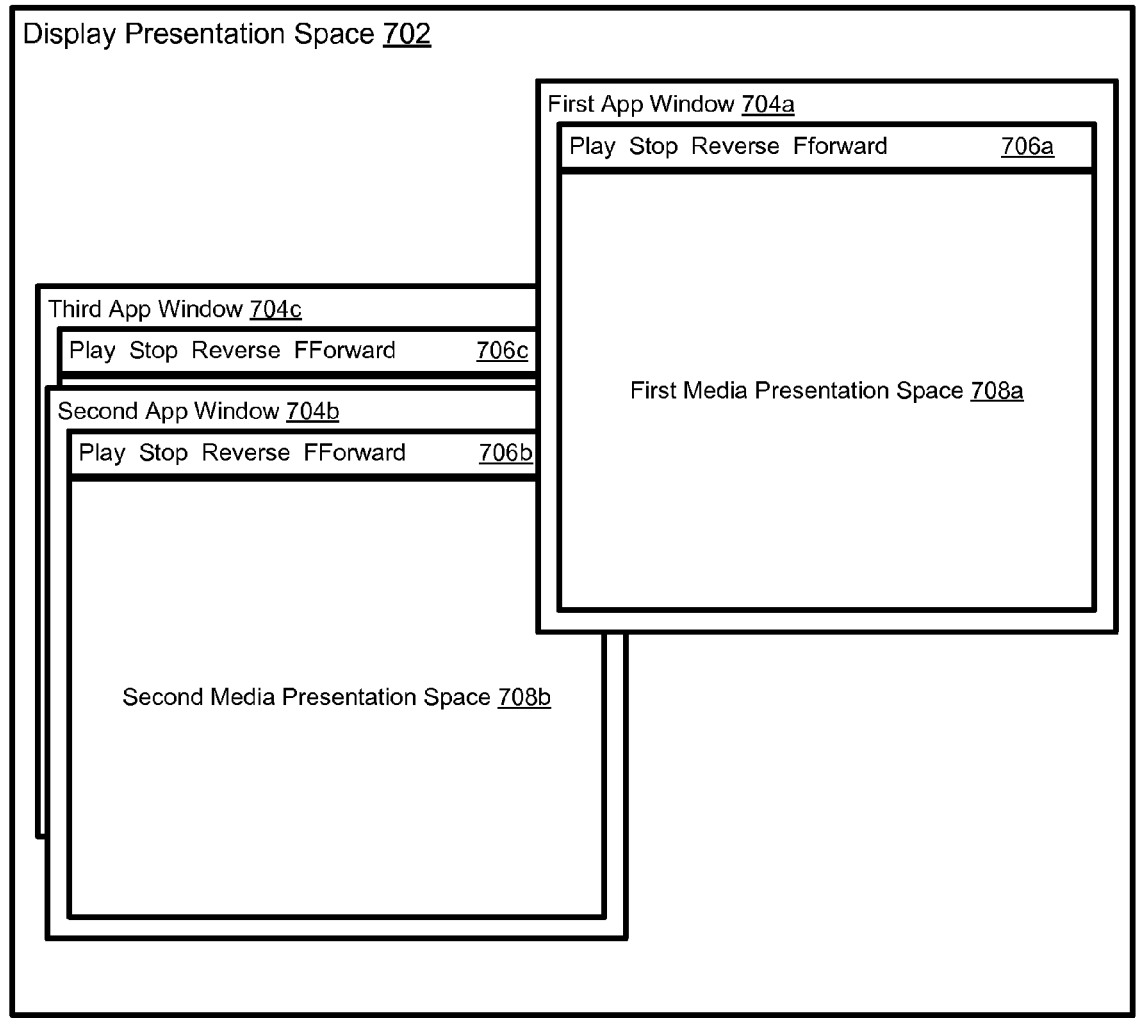
FIG. 7 is a diagram illustrating a user interface presented by a display according to an aspect of the subject matter described herein.

FIG. 7 illustrates a presentation space 702 of display 130 including application windows 704 of several media player applications 404. FIG. 7 is used to illustrate user interfaces of applications 404 operating in execution environments in FIG. 4*a*, FIG. 4*b*, and FIG. 4*c*, and web application 504 in FIG. 5. In some contexts, an execution environment in a specific figure is referred to and, in other contexts, the user interfaces of applications 404 are described as if the execution environments in FIG. 4*a*, FIG. 4*b*, and FIG. 4*c* are a single execution environment 402.

Application windows 704 illustrate a number of user interface elements typically found in media player user interfaces. Application windows 704 include respective command bars 706 with input controls for receiving user input to change the operational state of the respective media players represented. Application windows 704 also include respective user interface elements providing a presentation space 708 for presenting a video media stream. Second App Window 704*b* may be a browser window or tab presented by browser 404*b* in FIG. 4*b*. Second app window 704*b* includes a user interface of a web application provided by a remote node, such as web application 504 in application provider node 606.

The various user interface elements of applications 404 and web application 504 described above are presented by one or more user interface element handlers 416, 516. In an aspect illustrated in FIG. 4*a*, FIG. 4*b*, and in FIG. 4*c*, a user interface element handler 416 of one or more of the applications 404 is configured to send representation information representing a UI element, such as command bar 706 illustrated in FIG. 7, to GUI subsystem 420. GUI subsystem 420 may instruct graphics subsystem 422 to draw the user interface element in a region of a presentation space based on representation information received from a corresponding user interface element handler 416.

Input may be received corresponding to a user interface element via input driver 424. For example, FIG. 7 also illustrates command bar 706. A user may move a mouse to move a pointer presented in display presentation space 702 over an operation identified in command bar 706. The user may provide an input detected by the mouse. The detected input may be received by GUI subsystem 420 via input driver 424 as an operation indicator based on the association of the shared location of the pointer and the operation identifier in display presentation space 702.

FIGS. 4*a-c* illustrate presentation access components 452 as adaptations of and/or analogs of presentation access component 352 in FIG. 3. One or more presentation access components 452 may operate in execution environment 402. Accordingly, a system for coordinating playing of media streams includes means for detecting a first media player access to a first presentation device to play a first media stream. For example, as illustrated in FIG. 4*a-c*, presentation access component 452 is configured for detecting a first media player access to a first presentation device to play a first media stream.

FIG. 4*a*, FIG. 4*b*, and FIG. 4*c* illustrate various adaptations of presentation access components 452. FIG. 4*a*, illustrates presentation access component 452*a* included as a layer in the presentation subsystem of execution environment 402*a*. Graphics subsystem 422*a* may communicate with display driver 426*a* to communicate with display adapter 128 and display 130 to present image data, such as a frame of a video stream, on display 130. Audio subsystem 428*a* may communicate with audio driver 430*a* via presentation access component 452*a*, analogously. Presentation subsystems for other types of sensorial data may be configured similarly. Image and audio data may be presented as directed by applications 404*a* in FIG. 4*a*.

First app window 704*a* in FIG. 7 illustrates a user interface presented by display 130 as directed by first application 404*a*1. Applications 404*a* in FIG. 4*a* are illustrated including media player user interface element handlers (UIEH) 432*a* configured to interoperate with GUI subsystem 420*a* and/or audio subsystem 428*a* to present one or more video and/or audio streams on display 130 and/or an audio presentation device (not shown). Presentation access component 452*a* may intercept one or more communications between graphics subsystem 422*a* and display driver 426*a* detecting access to display 130 for playing a video stream by first media player UI element handler 432*a*1 of first application 404*a*1 in first media presentation space 708*a*. Presentation access component 452*a* may intercept one or more communications between audio subsystem 428*a* and audio driver 430*a* detecting access to the audio presentation device for playing an audio stream by second media player UI element handler 432*a*2 of second application 404*a*2. One or more of applications 404*a* may include and/or otherwise be a multimedia player accessing display driver 426*a* and audio driver 430*a* via presentation access component 452*a*.

FIG. 4*b* illustrates presentation access component 452*b* included in browser 404*b*. Browser 404*b* may include one or more content handlers 414 for processing media streams of various formats as described above. Content handlers for streaming media data are illustrated as media content handler 434. A media content handler 434 may present a media stream on a presentation device via media player UI element handler 432*b*. A browser may include one or more media player UI element handlers 432*b*, just as it may include one or more media content handlers 434. A media player UI element handler 432*b* may access a presentation device via interoperating with GUI subsystem 422*b*, audio subsystem 428*b*, and/or other sensorial presentation subsystem as described above.

In an aspect, at least part of a media player UI element handle 432*b* may be included in web application client 406 provided by a remote application, such as web application 504, in FIG. 5, operating in application provider node 606, in FIG. 6. In another aspect, media player UI element handler 432*b* may be and/or may be included in an extension of browser 404*b*. Media player UI element handler 432*b* is shown operating outside presentation controller 418*b* to illustrate media player UI element handler 432*b* as an extension of browser 404*b*. In still another aspect, media player UI element handler may be included in a media player application external to browser 404*b*. Presentation access component 452*b* may be configured to mediate access between a media content handler 434 and a media player UI element handler 432*b* in the various aspects.

For example, second app window 704*b* in FIG. 7 illustrates a user interface presented by display 130 as directed by browser 404*b*. Presentation access component 452*b* may be included in presenting a media stream and/or otherwise intercept one or more communications between media content handler 434 and media UI element handler 432*b* detecting access to a presentation device for playing a media stream by a media player, such as remote client application 406 and/or web application 504. In an aspect, remote client application 406 accesses media player UI element handler 432*b* via presentation access component 452*b* to play a video stream in second media presentation space 708*b* in FIG. 7.

FIG. 4*c* illustrates presentation access component 452*c* included as a layer between applications 404*c* and presentation subsystems of execution environment 402*c*. First application 404*c*1, for example, may communicate with GUI subsystem 420*c* to access display adapter 128 and display 130 to present a video. Second application 404*c*2 may communicate with audio subsystem 428*c* to access an audio presentation device via audio driver 430*c* to play an audio stream. Applications 404*c* may interoperate with presentation subsystems for other types of sensorial data and may be configured similarly.

For example, third app window 704*c* in FIG. 7 illustrates a user interface presented by display 130 as directed by first application 404*c*1. Applications 404*c* in FIG. 4*c* are illustrated including media player user interface element handlers (UIEH) 432*c* configured to interoperate with GUI subsystem 420*c* and/or audio subsystem 428*c* to present one or more video and/or audio streams on display 130 and/or an audio presentation device (not shown). Presentation access component 452*c* may intercept one or more communications between first application 404*c*1 and GUI subsystem 420*c* and/or audio subsystem 428*c* to detect access to display 130 for playing a video stream, for example by first media player UI element handler 432*c*1 of first application 404*c*1 in third media presentation space 708*c* (hidden in FIG. 7). Presentation access component 452*c* may intercept one or more communications between, for example, second application 404*c*2 and audio subsystem 428*c* detecting access to the audio presentation device for playing an audio stream by second media player UI element handler 432*c*2. One or more of applications 404*c* may include and/or otherwise be a multimedia player accessing GUI subsystem 420*c* and audio subsystem 428*c* via presentation access component 452*c*.

FIG. 4*a-c* illustrates focus state component 454 as an adaptation of and/or analog of focus state component 354 in FIG. 3. One or more focus state components 454 may operate in execution environment 402. Accordingly, a system for coordinating playing of media streams includes means for accessing first presentation focus information for determining whether the first media player has first presentation focus for playing the first media stream. For example, as illustrated in FIG. 4*a-c*, focus state component 454 is configured for accessing first presentation focus information for determining whether the first media player has first presentation focus for playing the first media stream.

The operation of various adaptations and aspects of focus state component are described above. FIG. 4*a*, FIG. 4*b*, and FIG. 4*c* illustrate some exemplary adaptations of focus state component 354 in FIG. 3. Adaptations of focus state component 454 in FIG. 4*a-c* illustrate various patterns of communication among components in adaptations of the arrangement in FIG. 3.

In FIG. 4*a*, focus state component 454*a* is operatively coupled to focus director component 456*a*. In an aspect, focus state component 454*a* accesses presentation focus information via interoperation with focus director component 456*a*. Presentation access component 452*a* may provide presentation focus information to focus state component 454*a* in response to detecting access to display 130 and/or other presentation devices. Presentation focus information provided by presentation access component 452*a* identifies and/or enables identification of a media player and/or a media stream. Identification may be indirect or direct.

For example, presentation access component 452*a* may detect an access to display 130 to present video stream data, but may not be enabled to identify a particular application and/or media stream. Focus state component 454*a* may interoperate with GUI subsystem 420*a*, graphics subsystem 422*a*, audio subsystem 428*a*, and/or other presentation components to identify a particular media player and/or media stream.

Presentation focus information may include a correlator provided by GUI subsystem 420*a*, graphics subsystem 422*a*, audio subsystem 428*a*, and/or other presentation components correlating the data intercepted by presentation access component 452*a* with a particular media player accessing one or more presentation subsystem components.

Alternatively or additionally, media player information may be passed from GUI subsystem 420*a*, graphics subsystem 422*a*, audio subsystem 428*a*, and/or other presentation components to presentation access component 452*a*. Presentation access component 452*a* may include and/or reference this information in presentation focus information. Based on presentation focus information received in response to detected media player accesses by presentation access component 452*a*, focus state component 454*a* may interoperate with focus director component 456*a* to maintain presentation focus data identifying one or more media players with presentation focus.

In another aspect, focus state component 454*a* may access presentation focus information from GUI subsystem 420*a*, graphics subsystem 422*a*, audio subsystem 428*a*, and/or other presentation components, in response to a request from focus director component 454*a*. Presentation focus information may include attributes such as z-order, input focus, and/or other attributes discussed above used in determining presentation focus.

In FIG. 4*b*, focus state component 454*b* is included in browser 404*b* and services media streaming applications, such as web application client 406 and/or web application 504 operating in and/or otherwise processed by browser 404*b* and browser 404*b* extensions. As described above with respect to FIG. 4*a*, focus state component 454*b* may access presentation focus information from presentation access component 452*b* in response to a detected access by a media player operating in and/or with browser 404*b*. Alternatively, focus state component 454*b* may provide presentation focus information upon request by focus director component 456*b*. As described, the content of presentation focus information varies according to the various aspects that may be enabled. In FIG. 4*b*, attribute information for determining presentation focus may differ from attribute information available in the arrangements illustrated in FIG. 4*a* and in FIG. 4*c*.

In FIG. 4*c*, presentation access component 452*c* interoperates with media player applications 404*c* in a more direct fashion than in FIG. 4*a*. Presentation access component 452*c* and focus state component 454*c* may identify accessing media players without assistance from GUI subsystem 420*c*, graphics subsystem 422*c*, audio subsystem 428*c*, and/or other presentation components. Focus state component 454*c* may interoperate with GUI subsystem 420c, graphics subsystem 422c, audio subsystem 428c, and/or other presentation components to access attribute information described above for determining presentation focus. As described with respect to FIG. 4a and FIG. 4b, focus state component 454c may receive presentation focus information in response to detected media player accesses and/or may access presentation focus information as requested by focus director component 456c. Presentation focus information may be received via asynchronous and/or synchronous communication in various aspects.

FIG. 4a-c illustrates focus director component 456 as an adaptation of and/or analog of focus director component 356 in FIG. 3. One or more focus director components 456 may operate in execution environment 402. Accordingly, a system for coordinating playing of media streams includes means for determining, based on the first presentation focus information, that the first media player has first presentation focus. For example, as illustrated in FIG. 4a-c, focus director component 456 is configured for determining, based on the first presentation focus information, that the first media player has first presentation focus.

FIG. 4a, FIG. 4b, and FIG. 4c illustrate exemplary adaptations of focus director component. Determination of presentation focus has been described above and is not repeated here. In various adaptations, information available for inclusion and/or reference by presentation focus information may vary enabling different policies and capabilities. For example, focus director component 456b in FIG. 4 may determine presentation focus in the context of browser 404b. Focus director component 456a and focus director component 456c may determine presentation focus for applications operating in the broader context of execution environment 402a and execution environment 402c.

In an example, first app window 704a in FIG. 7 is fully visible and at the top of the z-order with respect to second app window 704b and third app window 704c. In an aspect, presentation focus may be assigned to a media player with a media UI element having a media presentation space, such as first media presentation space 708a, that is fully visible to a user. Otherwise, in the aspect, media players are determined to not have presentation focus indicating they must be paused and/or otherwise prevented from playing.

In another aspect, presentation focus for display 130 may be determined based on a specified percentage or a particular portion of a media presentation space that is visible to a user. In FIG. 7, all of first media presentation space 708a is visible, most of second media presentation space is visible, and second media presentation space has a definable central area that is fully visible. Third media presentation space 708c included in third app window 704c is hidden.

The media player having first media presentation space 708a for playing a first video stream may be determined to have presentation focus for display 130 given one or more visibility attributes of first app windows 704a and/or its visual components. The media player having second media presentation space 708b for playing a second video stream may be determined to have presentation focus for display 130 as well given one or more visibility attributes of second app windows 704b and/or its visual components. The media player having third media presentation space 708c (hidden) for playing a third video stream may be determined to not have presentation focus for display 130 given one or more visibility attributes of first app windows 704c and/or its visual components.

In a further aspect, if third app window 704c is moved to also be visible, in one aspect its media player may be assigned presentation focus based on, for example, a specified percentage of the window which is visible. In another aspect its media player may not have focus, when focus director 456c is configured to limit the number of playing media streams on display 130 to a maximum of two. The media player for third app window 704c may be queued to wait for presentation focus. In a further aspect, a user input may be detected to raise a rank and/or priority associated with the media player for third app window 704c to a level allowing it to have presentation focus. Presentation focus may be taken away from one of the other two media players halting play of one of their media streams. Based on the priority and/or rank assigned to the media player for third app window 704c presentation focus may be taken from all other media players accessing display 130.

Although it may be desirable to allow media players to share access to a presentation device as illustrated in the description of media streams in first media presentation space 708a and second media presentation space 708b both having presentation focus and allowed to play on display 130, it might not be desirable in certain contexts which may depend on the type of presentation device. In an aspect, one of the audio streams associated with the two playing video streams may be prevented from playing simultaneously on user device 602 speakers (not shown). Presentation focus for audio may be determined according to different rules than presentation focus for display 130. For example, audio presentation focus in one aspect may be given to a media player that is most visible by a specified measure of visibility. For example, the audio stream associated with the video stream playing in first media presentation space 708a may be determined to have presentation focus for user device 602 speakers while other media players with audio streams to play may receive indications and/or otherwise be prevented from playing their audio streams on user device 602 speaker(s).

Based on the descriptions provided herein, those skilled in the art will see that there are many possible variations for determining presentation focus and that these variations may be fixed and/or user configurable for various execution environments, presentation devices, browsers, and/or network application providers.

FIG. 4a-c illustrates presentation access component 452 as an adaptation of and/or analog of presentation access component 352 in FIG. 3. One or more presentation access components 452 may operate in execution environment 402. Accordingly, a system for coordinating playing of media streams includes means for indicating, in response to determining the first media player has first presentation focus, that the first media player is allowed to play the first media stream via the first presentation device. For example, as illustrated in FIG. 4a-c, presentation access component 452 is configured for indicating, in response to determining the first media player has first presentation focus, that the first media player is allowed to play the first media stream via the first presentation device.

In FIG. 4a, presentation access component 452a may indicate a media player is allowed to play a media stream by passing intercepted invocations and data to a driver for the targeted presentation devices. In FIG. 4b, presentation access component 452b may indicate a media player is allowed to play a media stream by passing intercepted data from media content handler 434 to media UI element handler 432b allowing access to the targeted presentation device(s). In FIG. 4c, presentation access component 452c may indicate a media player is allowed to play a media stream by passing intercepted data from media UI element handler 432c to GUI subsystem 420c, graphics subsystem 422c, audio subsystem

428c, and/or other presentation components allowing access to the targeted presentation device(s).

Alternatively or additionally, in FIG. 4a, FIG. 4b, and FIG. 4c, presentation access component 452 may receive a request for permission to access a presentation device. Presentation access component 452 may block or allow a requesting thread to run based on the determination by focus director component 456 as described above. In another aspect, presentation access component 452 may respond to a request for permission providing a play or a no-play identifier to the calling presentation subsystem component. The calling component may access or not access a corresponding presentation device based on the identifier.

FIG. 5 illustrates presentation access component 552 as an adaptation of and/or analog of presentation access component 352 in FIG. 3. One or more presentation access components 552 may operate in execution environment 502. Accordingly, a system for coordinating playing of media streams includes means for detecting a first media player access to a first presentation device to play a first media stream. For example, as illustrated in FIG. 5, presentation access component 552 is configured for detecting a first media player access to a first presentation device to play a first media stream.

FIG. 5, illustrates presentation access component 552 included in web application 504. Web application 504 may provide and/or identify a media stream to be played in a remote application client 406, illustrated in FIG. 4b. In one aspect, presentation access component 552 may be a request handler included in model subsystem 514. When a web application client that includes and/or references a media stream for playing on a client, such as user node 602, is detected, a media player access to a presentation device of user node 602 is detected.

In another aspect, presentation access component 552 may be configured to process a message from user node 602 informing web application of a detected access to a presentation device for playing a media stream.

Presentation access component 552 may detect media player accesses for media streams provided by and/or otherwise identified by web application 504. Presentation access component 552 may detect media player accesses for media streams provided by and/or otherwise identified by network applications interoperating with network application platform 506 and/or otherwise operating in execution environment 502.

Presentation access component 552 may be configured to operate in and/or with network application platform 506, in an aspect. In yet another aspect, presentation access component 552 may receive access information for detecting media player accesses to one or more presentation devices of a remote client, such as user device 602, to detect media player accesses for applications 404 operating in user device 602 other than and/or in addition to browser 404b.

In an aspect, at least part of a media player UI element handler 432b may be included in web application client 406 provided by web application 504 in FIG. 5, and/or at least part of a media player UI element handler 532 may be included in web application 506. Presentation access component 552 may mediate access between media streamer component 534 and a media player UI element, such as media player UI element 532. Media streamer component 534 may access one or more media streams from media database 536 and/or may access media streams via network 604 stored on another node (not shown).

Second app window 704b in FIG. 7 illustrates a user interface presented by display 130 as directed by web application 504 via web application client 406 in FIG. 4b. Presentation access component 552 may be included in presenting a media stream and/or otherwise intercept one or more communications between media streamer 534 and media UI element handler 532 detecting access to a presentation device for playing a media stream by a media player, such as remote client application 406. In an aspect, media player UI element handler 532 generates and/or otherwise accesses some or all of web application client 406 to provide to browser 404b. A request for web application client 406 may be received. Media player UI element handler 532 may be invoked to generate some or all of the response data. Accesses to media player UI element handler 532 may be mediated via presentation access component 552 to play a video stream in second media presentation space 708b in FIG. 7 on display 130 of user device 602.

FIG. 5 illustrates focus state component 554 as an adaptation of and/or analog of focus state component 354 in FIG. 3. One or more focus state components 554 may operate in execution environment 502. Accordingly, a system for coordinating playing of media streams includes means for accessing first presentation focus information for determining whether the first media player has first presentation focus for playing the first media stream. For example, as illustrated in FIG. 5, focus state component 554 is configured for accessing first presentation focus information for determining whether the first media player has first presentation focus for playing the first media stream.

In FIG. 5 focus state component 554 is operatively coupled to focus director component 556. In an aspect, focus state component 554 accesses presentation focus information via interoperation with presentation access component 552. Presentation access component 552 may provide presentation focus information to focus state component 554 in response to detecting access to display media UI element handler 532. Presentation focus information provided by presentation access component 552 identifies a media player instance and/or a media stream.

Focus state component 554 may interoperate with focus director component 556 to maintain presentation focus data identifying one or more media players with presentation focus.

In another aspect, focus state component 554 may access presentation focus information from session information maintained for a remote client, such as web application client 406, in response to a request from focus director component 554. Presentation focus information may include attributes obtained via web application client 406, such as second app window's 704b z-order, input focus, and/or other attributes discussed above with respect to determining presentation focus.

FIG. 5 illustrates focus director component 556 as an adaptation of and/or analog of focus director component 356 in FIG. 3. One or more focus director components 556 may operate in execution environment 502. Accordingly, a system for coordinating playing of media streams includes means for determining, based on the first presentation focus information, that the first media player has first presentation focus. For example, as illustrated in FIG. 5, focus director component 556 is configured for determining, based on the first presentation focus information, that the first media player has first presentation focus.

FIG. 5 illustrates an exemplary adaptation of focus director component. Determination of presentation focus has been described above and is not repeated here. In various adaptations, information available for inclusion and/or reference by presentation focus information may vary enabling different policies and capabilities. For example, focus director component 556 in FIG. 5 may determine presentation focus in the context of a number of active windows in browser 404b in FIG. 4b provided by web application 504.

FIG. 5 illustrates presentation access component 552 as an adaptation of and/or analog of presentation access component 352 in FIG. 3. One or more presentation access components 552 may operate in execution environment 502. Accordingly, a system for coordinating playing of media streams includes means for indicating, in response to determining the first media player has first presentation focus, that the first media player is allowed to play the first media stream via the first presentation device. For example, as illustrated in FIG. 5, presentation access component 552 is configured for indicating, in response to determining the first media player has first presentation focus, that the first media player is allowed to play the first media stream via the first presentation device.

In FIG. 5, presentation access component 552 may indicate a media player is allowed to play a media stream by passing intercepted invocations and data to media player UI element handler 532 for a presenting on a presentation device of a client node, such as use node 602. In FIG. 5, presentation access component 552 may indicate a media player is allowed to play a media stream by passing intercepted data from media streamer 534 to media UI element handler 532.

Alternatively or additionally, in FIG. 5, presentation access component 552 may receive a request for permission to access media player UI element handler 532, media streamer 534, and/or another component included in playing a media stream. Presentation access component 552 may block or allow a requesting thread to run based on the determination by focus director component 556 as described above. In another aspect, presentation access component 552 may respond to a request for permission providing a play or a no-play return value and/or parameter value to the calling component. The calling component may access or not access a corresponding presentation device based on the return value and/or parameter value.

Figure 8:
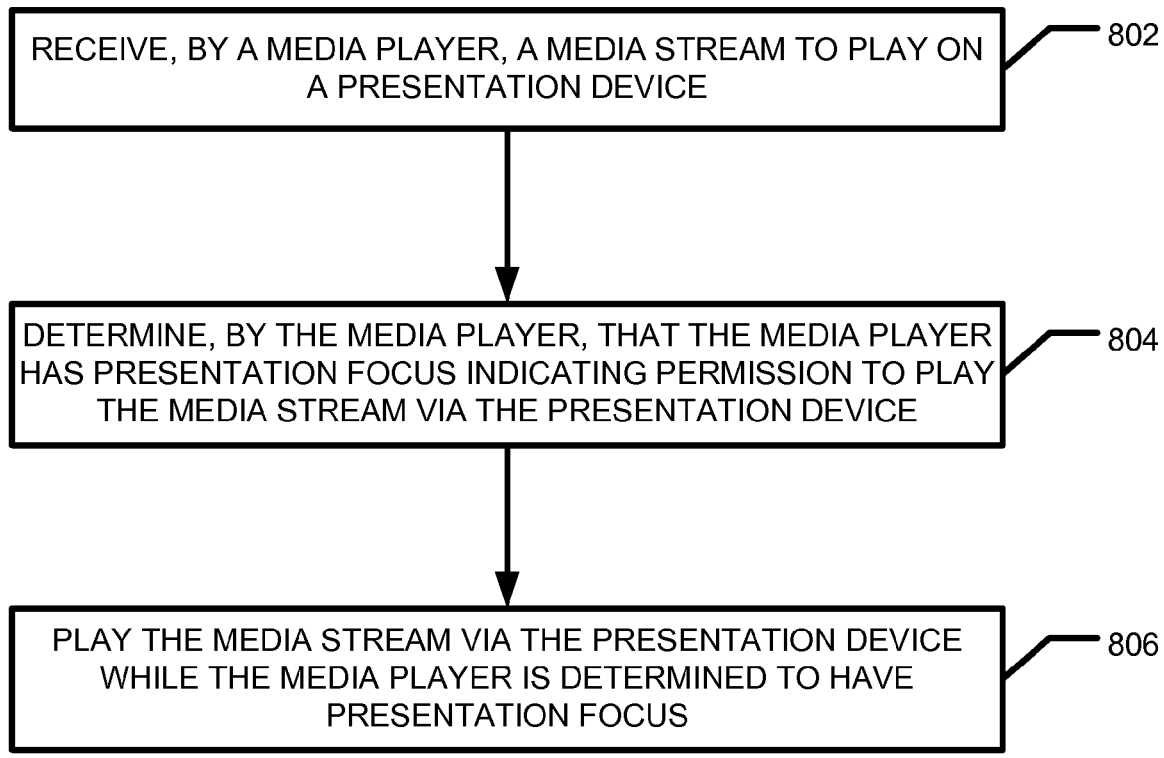
FIG. 8 is a flow diagram illustrating another method for coordinating playing of media streams according to an aspect of the subject matter described herein.

FIG. 8 is a flow diagram illustrating a method for coordinating playing of media streams according to an exemplary aspect of the subject matter described herein. FIG. 3 is a block diagram illustrating an arrangement of components for coordinating playing of media streams according to another exemplary aspect of the subject matter described herein. The method depicted in FIG. 8 may be carried out by some or all of the exemplary arrangements and their analogs.

A system for coordinating playing of media streams includes an execution environment, such as execution environment 102, including an instruction processing unit, such as processor 104, configured to process an instruction included in at least one of a presentation access component and a focus director component. The components illustrated in FIG. 3 may be adapted for performing the method illustrated in FIG. 8 in a number of execution environments.

With reference to FIG. 8, block 802 illustrates the method includes receiving, by a media player, a media stream to play on a presentation device. Accordingly, a system for coordinating playing of media streams includes means for receiving, by a media player, a media stream to play on a presentation device. For example, as illustrated in FIG. 3, presentation access component 352 is configured for receiving, by a media player, a media stream to play on a presentation device.

Returning to FIG. 8, block 804 illustrates the method further includes determining, by the media player, that the media player has presentation focus indicating permission to play the media stream via the presentation device. Accordingly, a system for coordinating playing of media streams includes means for determining, by the media player, that the media player has presentation focus indicating permission to play the media stream via the presentation device. For example, as illustrated in FIG. 3, focus director component 354 is configured for determining, by the media player, that the media player has presentation focus indicating permission to play the media stream via the presentation device.

Returning to FIG. 8, block 806 illustrates the method yet further includes playing the media stream via the presentation device while the media player is determined to have presentation focus. Accordingly, a system for coordinating playing of media streams includes means for playing the media stream via the presentation device while the media player is determined to have presentation focus. For example, as illustrated in FIG. 3, presentation access component 356 is configured for playing the media stream via the presentation device while the media player is determined to have presentation focus.

The arrangement of components in FIG. 3 and various adaptations of the arrangement for performing the method illustrated in FIG. 8 are described above with respect to execution environments illustrated in FIG. 1, FIG. 4a-c, and FIG. 5.

It is noted that the methods described herein, in an aspect, are embodied in executable instructions stored in a non-transitory computer readable storage medium for use by or in connection with an instruction execution machine, apparatus, or device, such as a computer-based or processor-containing machine, apparatus, or device. It will be appreciated by those skilled in the art that for some embodiments, other types of non-transitory computer readable storage media are included which may store data that is accessible by a computer, such as magnetic cassettes, flash memory cards, digital video disks, Bernoulli cartridges, random access memory (RAM), read-only memory (ROM), and the like.

As used here, a "non-transitory computer readable storage medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include in one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components is implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

I claim:

1. A method comprising:
    detecting, based on a first user interface element, a first media player that is assigned a first presentation focus allowing the first media player to play a first media stream in the first user interface element presented via a first presentation device;
    identifying a first change in the first presentation focus;
    determining, based on the first change, that the first media player is not assigned the first presentation focus;
    indicating that the detected first media player is not allowed to play the first media stream in the first user interface element, in response to the determining based on the first change;
    identifying a second change in the first presentation focus;
    determining, based on the second change, that the first media player is assigned the first presentation focus; and
    indicating that the first media player is allowed to play the first media stream in the first user interface element, in response to the determining based on the second change;
    wherein performing at least one of the preceding actions comprising the method includes execution of an instruction by a processor;
    wherein the first change in the first presentation focus is based on a releasing of the first presentation focus assigned to a second media player based on a second user interface element for presenting a second media stream by the second media player.

2. The method of claim 1 wherein the detecting includes intercepting representation information, for presenting at least a portion of the first media stream, sent to play the at least a portion of the first media stream.

3. The method of claim 1 wherein the first user interface element is included in a user interface presented by a web browser and the first presentation focus is assigned by the web browser.

4. The method of claim 1 wherein the detecting includes receiving session information via a network from a remote client and the method includes detecting that the first media player is assigned the first presentation focus based on the session information.

5. The method of claim 1 wherein at least one of a media player application, a graphical user interface subsystem, a graphics subsystem, a display driver, an audio driver, a user interface element handler component, and a device communicatively coupled to the first presentation device via a network is included in the detecting.

6. The method of claim 1 wherein the user interface element is not assigned input focus for any input device while the first media player is assigned the first presentation focus.

7. The method of claim 1 wherein whether the first media player is assigned the first presentation focus is based on whether the first user interface element is assigned a first input focus for a first input device.

8. The method of claim 1 wherein the determining based on the first change includes:
   detecting a second access to a second presentation device to play a second media stream by the first media player; and
   determining whether the first media player has a second presentation focus to play the second media stream via the second presentation device.

9. The method of claim 8 wherein determining whether the first media player has a second presentation focus to play the second media stream via the second presentation device includes:
   determining that a second media player has the second presentation focus; and
   indicating, in response to determining the second media player has the second presentation focus, that the detected first media player is not allowed to play the first media stream, via the first presentation device.

10. The method of claim 9 wherein the determining that second media player has the second presentation includes determining that the first media player does not have second presentation focus.

11. The method of claim 1 wherein indicating that the first media player is not allowed to play the first media stream includes preventing sending of representation information based on data in the first media stream to present in the first user interface element.

12. An apparatus, comprising:
    a portable first presentation device having a touchscreen and being capable of providing access to a plurality of applications including a first media player and a second media player, the first presentation device capable of communication with a second presentation device including a display on a wireless local area network on which the first presentation device resides for allowing at least one of the first media player or the second media player to play at least one media stream including video via the second presentation device based on user input, the first presentation device configured for:
    identifying a first change in a first presentation focus;
    determining, based on the first change, that the first media player is not assigned the first presentation focus;
    indicating that the first media player is not to play a first media stream including video, in response to the determining based on the first change;
    identifying a second change in the first presentation focus;
    determining, based on the second change, that the first media player is assigned the first presentation focus; and
    indicating that the first media player is to play the first media stream via at least one of the first presentation device or the second presentation device based on user input, in response to the determining based on the second change;
    wherein the first presentation device is operable such that the first media player is capable of playing the first media stream via both the first presentation device and the second presentation device.

13. The apparatus of claim 12 wherein the first presentation device is operable such that at least one of the first presentation device or the second presentation device is capable of being utilized based on user input received in connection with at least one operating system user interface element of the first presentation device including a rewind icon or a forward icon.

14. The apparatus of claim 12 wherein the first presentation device is operable such that at least one of the first presentation device or the second presentation device is capable of being utilized based on user input received in connection with at least one user interface element of the first presentation device including a rewind icon or a forward icon, the at least one user interface element being part of an operating system that is capable of being displayed while the first media stream is presented via the second presentation device.

15. The apparatus of claim 12 wherein the first presentation device is operable such that at least one of the first presentation device or the second presentation device is capable of being utilized based on user input received in connection with at least one user interface element of the first presentation device including a rewind icon or a forward icon, the at least one user interface element being part of an operating system and being separate from the first media player, where the at least one user interface element is capable of being displayed while the first media stream is presented via the first presentation device.

16. The apparatus of claim 12 wherein the first presentation device is operable such that the first presentation device is further capable of communication with a third presentation device including a display via the wireless local area network on which the first presentation device resides for utilizing, based on user input, the second presentation device or the third presentation device for presenting at least one web page downloaded by a web browser installed on the first presentation device.

17. The apparatus of claim 12 wherein the apparatus is operable for utilizing the second presentation device, based on user input, for presenting at least one web page downloaded by a web browser installed on the first presentation device.

18. An apparatus, comprising:
    a portable first presentation device having a touchscreen and being capable of providing access to a plurality of applications including a first media player and a second media player, the first presentation device capable of communication with a second presentation device including a display on a wireless local area network on which the first presentation device resides, the first presentation device configured for:
    identifying a first change in a first presentation focus;
    determining, based on the first change, that the first media player is not assigned the first presentation focus;
    indicating that the first media player is not to play a first media stream including video, in response to the determining based on the first change;
    detecting an access to the second presentation device to play a second media stream including video by the first media player; and
    determining whether the first media player has a second presentation focus to play the second media stream via the second presentation device.

19. The apparatus of claim 18 wherein the first presentation device is operable such that determining whether the first media player has the second presentation focus to play the second media stream via the second presentation device includes:
    determining that the second media player has the second presentation focus; and
    indicating, in response to determining the second media player has the second presentation focus, that the detected first media player is not to play the first media stream, via the first presentation device.

20. The apparatus of claim 19 wherein the first presentation device is operable such that the determining that the second media player has the second presentation includes determining that the first media player does not have the second presentation focus.

21. The apparatus of claim 18 wherein the first presentation device is operable such that a command interface including a rewind option and a forward option is displayed while the second media stream is presented via the second presentation device.

22. The apparatus of claim 18 wherein the first presentation device is operable such that, if it is determined that the first media player has the second presentation focus to play the second media stream via the second presentation device, the second media stream is presented via the second presentation device and not presented via the first presentation device.

23. The apparatus of claim 18 wherein the first presentation device is operable such that, if it is determined that the first media player has the second presentation focus to play the second media stream via the second presentation device, the second media stream is wirelessly communicated by the first presentation device in, at least in part, an unprocessed form, for being processed for presentation prior to being presented via the second presentation device.

24. The apparatus of claim 18 wherein the first presentation device is operable such that, if it is determined that the first media player has the second presentation focus to play the second media stream via the second presentation device, the second media stream is wirelessly communicated by the first presentation device in a processed form, for being presented via the second presentation device.

25. The apparatus of claim 18 wherein the first presentation device is operable such that the second media stream is communicated from a remote node directly to the second presentation device.

26. The apparatus of claim 18 wherein the first presentation device is operable such that user input is capable of being received in connection with a user interface element displayed with a command interface element including a rewind icon or a forward icon for changing an operational state of the first media player in connection with the second media stream.

27. The apparatus of claim 26 wherein the first presentation device is operable such that the command interface element is a component of an application associated with the first media player, and capable of being displayed while the second media stream is presented via the second presentation device.

28. The apparatus of claim 18 wherein the first presentation device is operable such that the determination whether the first media player has the second presentation focus is based on a detected user input indication.

29. The apparatus of claim 18 wherein the first presentation device is operable such that at least one of the first presentation device or the second presentation device is capable of being utilized based on user input received in connection with at least one operating system user interface element of the first presentation device including a rewind icon or a forward icon.

30. The apparatus of claim 18 wherein the first presentation device is operable such that the first media player is capable of playing the first media stream via both the first presentation device and the second presentation device.

31. The apparatus of claim 18 wherein the first presentation device is operable such that the first media player is to play the first media stream via at least one of the first presentation device or the second presentation device, based on user input.

32. The apparatus of claim 18 wherein the first presentation device is operable such that at least one of the first presentation device or the second presentation device is capable of being utilized based on user input received in connection with at least one user interface element of the first presentation device including a rewind icon or a forward icon, the at least one user interface element being part of an operating system that is capable of being displayed while the first media stream is presented via the second presentation device.

33. The apparatus of claim 18 wherein the first presentation device is operable such that at least one of the first presentation device or the second presentation device is capable of being utilized based on user input received in connection with at least one user interface element of the first presentation device including a rewind icon or a forward icon, the at least one user interface element being part of an operating system and being separate from the first media player, where the at least one user interface element is capable of being displayed while the first media player is displayed.

34. A program product embodied on a non-transitory computer readable medium, comprising:
code for working in association with a first presentation device including a touchscreen for playing a first media stream including video utilizing a first media player, and for communicating with a second presentation device including a display via a wireless local area network on which the first presentation device resides;
code for determining whether the first media player has a first presentation focus for the first presentation device indicating that the first media player is to play the first media stream via the first presentation device;
code for indicating that the first media player is not to play the first media stream, via the first presentation device, in response to determining that the first media player does not have the first presentation focus;
code for detecting an access to the second presentation device to play the first media stream by the first media player; and
code for determining whether the first media player has a second presentation focus to play the first media stream via the second presentation device.

35. The program product of claim 34 wherein the program product is operable such that determining whether the first media player has the second presentation focus to play the first media stream via the second presentation device includes:
determining that a second media player has the second presentation focus; and
indicating, in response to determining the second media player has the second presentation focus, that the detected first media player is not to play the first media stream, via the first presentation device.

36. The program product of claim 35 wherein the program product is operable such that the determining that the second media player has the second presentation includes determining that the first media player does not have the second presentation focus.

37. The program product of claim 34 wherein the program product is operable such that a command interface including a rewind option and a forward option is displayed while the first media stream is presented via the second presentation device.

38. The program product of claim 34 wherein the program product is operable such that, if it is determined that the first media player has the second presentation focus to play the first media stream via the second presentation device, the first media stream is presented via the second presentation device and not presented via the first presentation device.

39. The program product of claim 34 wherein the program product is operable such that, if it is determined that the first media player has the second presentation focus to play the first media stream via the second presentation device, the first media stream is wirelessly communicated by the first presentation device in, at least in part, an unprocessed form, for being processed for presentation prior to being presented via the second presentation device.

40. The program product of claim 34 wherein the program product is operable such that, if it is determined that the first media player has the second presentation focus to play the first media stream via the second presentation device, the first media stream is wirelessly communicated by the first presentation device in a processed form, for being presented via the second presentation device.

41. The program product of claim 34 wherein the program product is operable such that the first media stream is communicated from a remote node directly to the second presentation device.

42. The program product of claim 34 wherein the program product is operable such that user input is capable of being received in connection with at least one user interface element of the first media player that is displayed with a command interface element including a rewind icon or a forward icon, for utilizing the second presentation device to present the first media stream while the first media player does not play the first media stream via the first presentation device.

43. The program product of claim 34 wherein the program product is operable such that user input is capable of being received in connection with at least one user interface element of the first media player that is displayed with a command interface element including a rewind icon or a forward icon, for utilizing the second presentation device to present the first media stream while the first media player plays the first media stream via the first presentation device.

44. The program product of claim 34 wherein the program product is operable such that user input is capable of being received in connection with at least one operating system user interface element displayed with a command interface element including a rewind icon or a forward icon, for utilizing the second presentation device to present the first media stream while the first media player plays the first media stream via the first presentation device.

45. The program product of claim 34 wherein the program product is operable such that user input is capable of being received in connection with at least one operating system user interface element displayed with a command interface element including a rewind icon or a forward icon, for utilizing the second presentation device to present the first media stream while the first media player does not play the first media stream via the first presentation device.

46. The program product of claim 34 wherein the program product is operable such that at least one of the first presentation device or the second presentation device is capable of being utilized based on user input received in connection with at least one operating system user interface element of the first presentation device including a rewind icon or a forward icon.

47. The program product of claim 34 wherein the program product is operable such that the first media player is to play the first media stream via at least one of the first presentation device or the second presentation device, based on user input.

48. The program product of claim 34 wherein the program product is operable such that at least one of the first presentation device or the second presentation device is capable of being utilized based on user input received in connection with at least one user interface element of the first presentation device including a rewind icon or a forward icon, the at least one user interface element being part of an operating system that is capable of being displayed while the first media stream is presented via the second presentation device.

49. A program product embodied on a non-transitory computer readable medium, comprising:
 code for working in association with a portable first presentation device including a touchscreen and a first media player and a second media player installed thereon, for communicating with a second presentation device including a display via a wireless local area network on which the first presentation device resides for utilizing the second presentation device, based on user input, for playing a first media stream including video in a first user interface element utilizing, based on user input, the first media player;
 code for identifying a first change in a first presentation focus;
 code for determining, based on the first change, that the first media player is not assigned the first presentation focus; and
 code for indicating that the first media player is not to play the first media stream, in response to the determining based on the first change;
 wherein the program product is operable such that the first change in the first presentation focus is based on a releasing of the first presentation focus based on a second user interface element for playing a second media stream by the second media player.

50. The program product of claim 49 wherein the program product is operable such that, if it is determined that the first media player is to play the first media stream via the second presentation device, the first media stream is wirelessly communicated by the first presentation device in a processed form, for being presented via the second presentation device.

51. The program product of claim 50 wherein the program product is operable such that the first media stream is communicated from a remote node directly to the second presentation device.

52. The program product of claim 49 wherein the program product is operable such that, if it is determined that the first media player has the second presentation focus to play the first media stream via the second presentation device, the first media stream is wirelessly communicated by the first presentation device in, at least in part, an unprocessed form, for being processed for presentation prior to being presented via the second presentation device.

53. The program product of claim 49 wherein the program product is operable such that user input is capable of being received in connection with at least one user interface element of the first media player that is displayed with a command interface element including a rewind icon or a forward icon, for utilizing the second presentation device to present the first media stream while the first media player does not play the first media stream via the first presentation device.

54. The program product of claim 49 wherein the program product is operable such that user input is capable of being received in connection with at least one user interface element of the first media player that is displayed with a command interface element including a rewind icon or a forward icon, for utilizing the second presentation device to present the first media stream while the first media player plays the first media stream via the first presentation device.

55. The program product of claim 49 wherein the program product is operable such that user input is capable of being received in connection with at least one operating system user interface element displayed with a command interface element including a rewind icon or a forward icon, for utilizing the second presentation device to present the first media stream while the first media player plays the first media stream via the first presentation device.

56. The program product of claim 49 wherein the program product is operable such that user input is capable of being received in connection with at least one operating system user interface element displayed with a command interface element including a rewind icon or a forward icon, for utilizing the second presentation device to present the first media stream while the first media player does not play the first media stream via the first presentation device.

57. The program product of claim 49 wherein the program product is operable such that the first media player is capable of playing the first media stream via both the first presentation device and the second presentation device.

58. The program product of claim 49 wherein the program product is operable such that the first media player is to play the first media stream via at least one of the first presentation device or the second presentation device, based on user input.

59. The program product of claim 49 wherein the program product is operable such that at least one of the first presentation device or the second presentation device is capable of being utilized based on user input received in connection with at least one user interface element of the first presentation device including a rewind icon or a forward icon, the at least one user interface element being part of an operating system that is capable of being displayed while the first media player is displayed.

60. The program product of claim 49 wherein the program product is operable for utilizing the second presentation device, in response to user input, for presenting at least one web page via a web browser installed on the first presentation device.

61. A computer program product embodied on a non-transitory computer readable medium, comprising:
    code for working in association with a first presentation device having a touchscreen that is capable of providing access to a first media player and a second media player in an execution environment, the first presentation device capable of communication with a second presentation device including a display via a wireless local area network on which the first presentation device resides, where presentation focus information is accessible for identifying whether at least one of the first presentation device or the second presentation device is to be utilized for presentation;
    code for detecting access to the first media player to play a first media stream that includes video;
    code for indicating, if the first presentation device is to be utilized for presentation based on the presentation focus information, that the first media stream is allowed to be presented via the first presentation device; and
    code for indicating, if the second presentation device is to be utilized for presentation based on the presentation focus information, that the first media stream is allowed to be presented via the second presentation device;
    wherein the computer program product is operable such that a change in presentation focus is capable of being based on at least one of a releasing of a first presentation focus in connection with the first media player, a detected user input indication for giving the second media player a second presentation focus, a change in input focus, a change in an attribute of a user interface element, a transparency level of at least one of the user interface element, or another user interface element sharing a region of a display of the first presentation device.

62. The computer program product of claim 61 wherein the computer program product is operable such that a command interface including a rewind option and a forward option is displayed while the first media stream is allowed to be presented via the second presentation device.

63. The computer program product of claim 62 wherein the computer program product is operable such that the indicating, if the second presentation device is to be utilized for presentation based on the presentation focus information, that the first media stream is allowed to be presented via the second presentation device, results in just the first media stream being presented via the second presentation device and the first media stream played by the first media player not being allowed to be presented via the first presentation device.

64. The computer program product of claim 61 wherein the computer program product is operable such that the indicating, if the second presentation device is to be utilized for presentation based on the presentation focus information, that the first media stream is allowed to be presented via the second presentation device, results in the first media stream being wirelessly communicated by the first presentation device in, at least in part, an unprocessed form, for being processed for presentation prior to being presented via the second presentation device.

65. The computer program product of claim 61 and further comprising code for indicating, if both the first presentation device and the second presentation device are to be utilized for presentation based on the presentation focus information, that the first media stream is allowed to be presented via the first presentation device and the second presentation device, resulting in the first media stream being wirelessly communicated by the first presentation device in a processed form such that the first media stream is configured to be presented via the second presentation device.

66. The computer program product of claim 61 wherein the computer program product is operable such that the first media stream is communicated from a remote node directly to the second presentation device.

67. The computer program product of claim 61 wherein the computer program product is operable such that the presentation focus information is capable of being changed based on user input received in connection with a user interface element displayed with a command interface element including a rewind icon or a forward icon for changing an operational state of the first media player in connection with the first media stream.

68. The computer program product of claim 67 wherein the computer program product is operable such that the command interface element is a component of an application associated with the first media player, and capable of being displayed while the first media stream is allowed to be presented via the second presentation device.

69. The computer program product of claim 67 wherein the computer program product is operable such that the command interface element is a component of an operating system separate from an application associated with the first media player, and capable of being displayed while the first media stream is allowed to be presented via the second presentation device.

70. The computer program product of claim 61 wherein the computer program product is operable such that the change in the presentation focus is based on the detected user input indication for giving the second media player a second presentation focus.

71. The computer program product of claim 70 wherein the computer program product is operable such that the detected user input indication for giving the second media player the second presentation focus includes an access to the second media player to play a second media stream that includes video, and further comprising:
- code for indicating, if the first presentation device is to be utilized for presentation based on the presentation focus information, that the second media player is allowed to play the second media stream via the first presentation device; and
- code for indicating, if the second presentation device is to be utilized for presentation based on the presentation focus information, that the second media player is allowed to play the second media stream via the second presentation device.

72. An apparatus, comprising:
- a first presentation device having a touchscreen that is capable of providing access to a plurality of applications including a first media player and a second media player in an execution environment, the first presentation device capable of communication with a second presentation device including a display via a wireless local area network on which the first presentation device resides, where execution environment presentation focus information is accessible for identifying whether at least one of the first presentation device or the second presentation device is to be utilized for presentation in connection with the applications, the first presentation device configured for:
- detecting access to the first media player to play a first media stream that includes video;
- indicating, if the first presentation device is to be utilized for presentation based on the execution environment presentation focus information, that the first media player is allowed to play the first media stream via the first presentation device;
- indicating, if the second presentation device is to be utilized for presentation based on the execution environment presentation focus information, that the first media player is allowed to play the first media stream via the second presentation device; and
- indicating, if both the first presentation device and the second presentation device are to be utilized for presentation based on the execution environment presentation focus information, that the first media player is allowed to play the first media stream via both the first presentation device and the second presentation device;
- wherein the first presentation device is operable such that a change in presentation focus is capable of being based on at least one of a releasing of a first presentation focus in connection with the first media player, a detected user input indication for giving the second media player a second presentation focus, a change in input focus, a change in an attribute of a user interface element, a transparency level of at least one of the user interface element, or another user interface element sharing a region of a display of the first presentation device.

73. The apparatus of claim 72 wherein the first presentation device is operable such that a command interface including a rewind option and a forward option is displayed while the first media stream is allowed to be presented via the second presentation device, so that the first presentation device is capable of providing remote control of the first media stream that is allowed to be presented via the second presentation device; wherein the apparatus is further operable such that the indicating, if the second presentation device is to be utilized for presentation based on the presentation focus information, that the first media stream is allowed to be presented via the second presentation device, results in just the first media stream being presented via the second presentation device and the first media stream played by the first media player not being allowed to be presented via the first presentation device; wherein the apparatus is further operable such that the indicating, if the second presentation device is to be utilized for presentation based on the presentation focus information, that the first media stream is allowed to be presented via the second presentation device, results in the first media stream being wirelessly communicated by the first presentation device in, at least in part, an unprocessed form, for being processed for presentation prior to being presented via the second presentation device.

* * * * *